US011990675B2

(12) United States Patent
Hussain

(10) Patent No.: US 11,990,675 B2
(45) Date of Patent: May 21, 2024

(54) APERTURE SHARED SLOT-BASED SUB-6 GHz AND MM-WAVE IoT ANTENNA FOR 5G APPLICATIONS

(71) Applicant: KING FAHD UNIVERSITY OF PETROLEUM AND MINERALS, Dhahran (SA)

(72) Inventor: Rifaqat Hussain, Dhahran (SA)

(73) Assignee: KING FAHD UNIVERSITY OF PETROLEUM AND MINERALS, Dhahran (SA)

( * ) Notice: Subject to any disclaimer, the term of this patent is extended or adjusted under 35 U.S.C. 154(b) by 154 days.

(21) Appl. No.: 17/890,751

(22) Filed: Aug. 18, 2022

(65) Prior Publication Data

US 2023/0198155 A1 Jun. 22, 2023

Related U.S. Application Data

(60) Provisional application No. 63/292,100, filed on Dec. 21, 2021.

(51) Int. Cl.
*H01Q 13/10* (2006.01)
*H01P 5/12* (2006.01)
*H01Q 5/35* (2015.01)

(52) U.S. Cl.
CPC ............ *H01Q 13/106* (2013.01); *H01P 5/12* (2013.01); *H01Q 5/35* (2015.01)

(58) Field of Classification Search
CPC ........ H01Q 5/35; H01Q 13/10; H01Q 13/106; H01P 5/12
See application file for complete search history.

(56) References Cited

U.S. PATENT DOCUMENTS

2001/0048399 A1* 12/2001 Oberschmidt ....... H01Q 13/106 343/895
2008/0079644 A1* 4/2008 Cheng .................... H01Q 13/10 343/769

(Continued)

FOREIGN PATENT DOCUMENTS

BR 102019014114-0 A2 1/2021
CN 204538245 U 8/2015

(Continued)

OTHER PUBLICATIONS

Mohammad S. Sharawi, et al., "A Two Concentric Slot Loop Based Connected Array MIMO Antenna System for 4G/5G Terminals", IEEE Transactions on Antennas and Propagation, vol. 65, Issue 12, Feb. 17, 2017, pp. 6679-6686.

*Primary Examiner* — Ab Salam Alkassim, Jr.
*Assistant Examiner* — Leah Rosenberg
(74) *Attorney, Agent, or Firm* — Oblon, McClelland, Maier & Neustadt, L.L.P.

(57) ABSTRACT

An antenna system and a method for fabricating an antenna system are disclosed. The antenna system includes a substrate having a top side and a bottom side, a single straight microstrip line on the top side of the substrate, a microstrip power divider (PD) on the top side of the substrate, and a ground plane on the bottom side. An input end of the single straight microstrip line is adjacent and vertical to a first edge of the substrate, and an output end of the single straight microstrip line is open. An input end of the microstrip PD is adjacent and vertical to a second edge of the substrate, and eight output ends of the microstrip PD are open. The first edge is parallel to the second edge. Further, three concentric square slots are etched on the ground plane.

20 Claims, 24 Drawing Sheets

(56) References Cited

U.S. PATENT DOCUMENTS

| | | | | |
|---|---|---|---|---|
| 2011/0090129 | A1* | 4/2011 | Weily | H01Q 21/24 343/770 |
| 2016/0164182 | A1* | 6/2016 | Lai | H01Q 21/0006 216/13 |
| 2017/0141465 | A1* | 5/2017 | Sharawi | H01Q 1/521 |
| 2018/0241136 | A1* | 8/2018 | Sharawi | H04B 5/00 |
| 2018/0323510 | A1* | 11/2018 | Boryssenko | H01Q 5/35 |
| 2019/0305415 | A1* | 10/2019 | Sharawi | H01Q 1/523 |
| 2019/0305423 | A1* | 10/2019 | Hussain | H01Q 5/10 |
| 2019/0372200 | A1* | 12/2019 | Sharawi | H01Q 1/38 |
| 2019/0379135 | A1* | 12/2019 | Sharawi | H01Q 21/064 |
| 2021/0005975 | A1* | 1/2021 | Hussain | H01Q 21/28 |
| 2023/0268664 | A1* | 8/2023 | Hussain | H01Q 21/064 343/748 |

FOREIGN PATENT DOCUMENTS

| | | | |
|---|---|---|---|
| CN | 108155468 | A | 6/2018 |
| CN | 108336491 | A | 7/2018 |
| CN | 113013610 | A | 6/2021 |

* cited by examiner

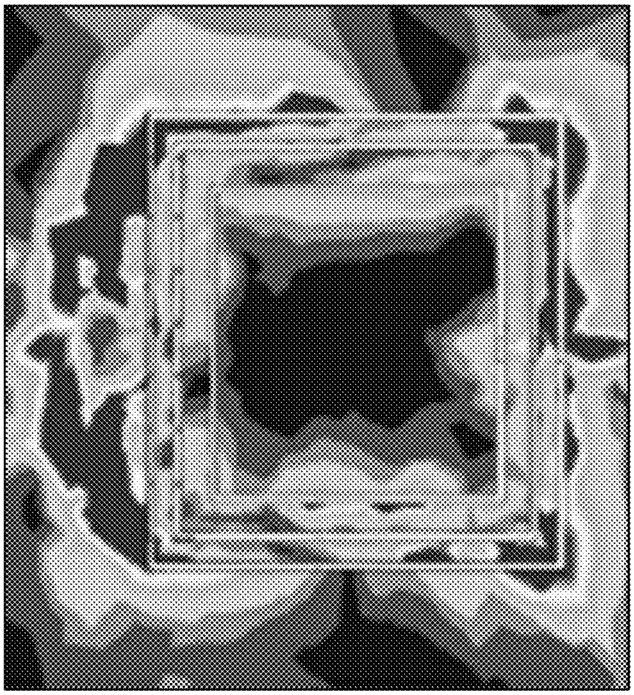
FIG. 7B
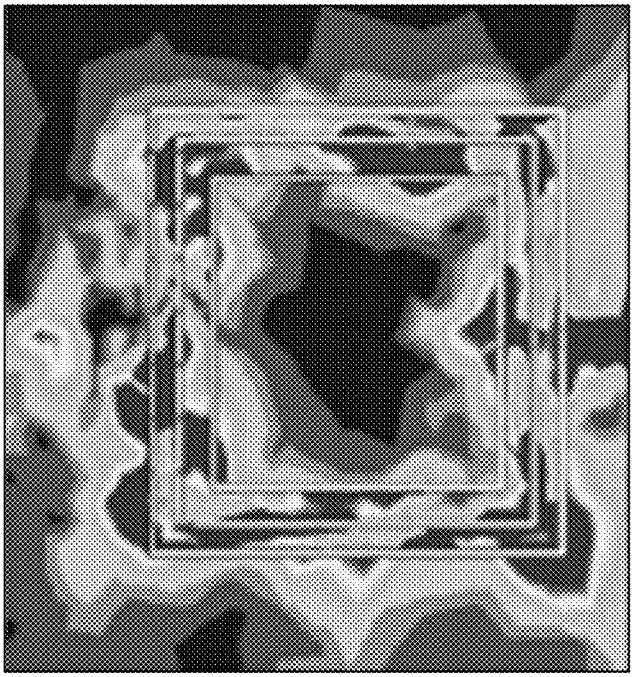
FIG. 7A
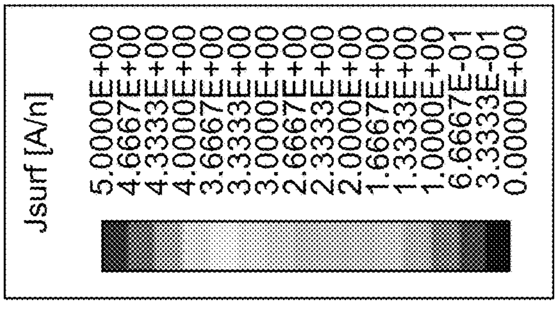

732
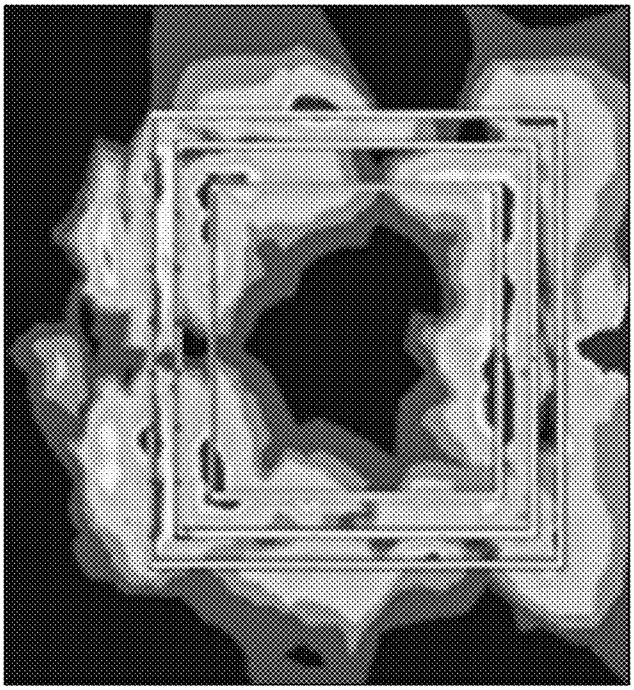
FIG. 7D
722
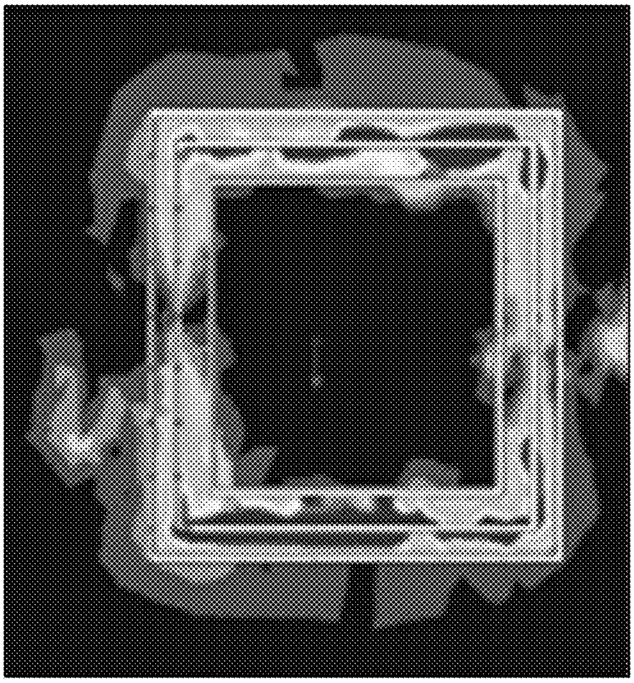
FIG. 7C
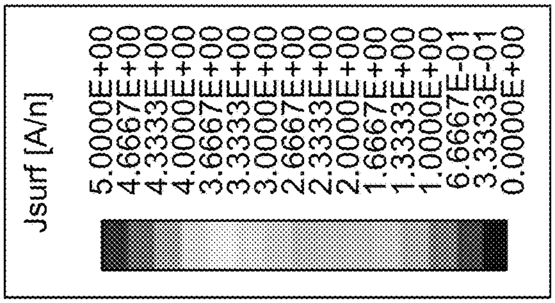

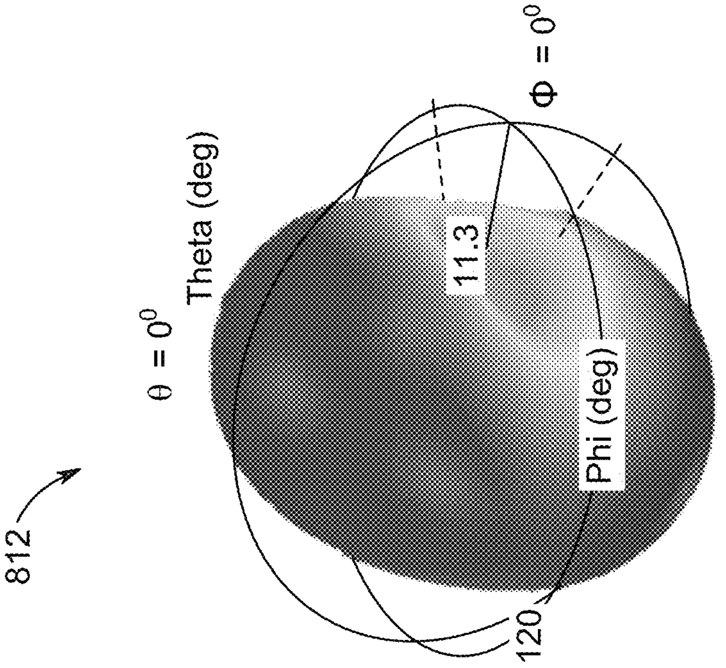
FIG. 8B
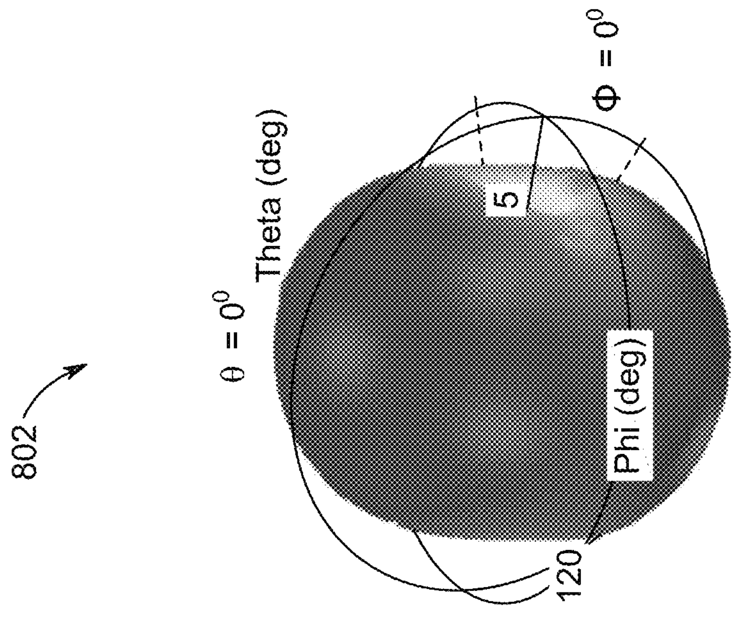
FIG. 8A
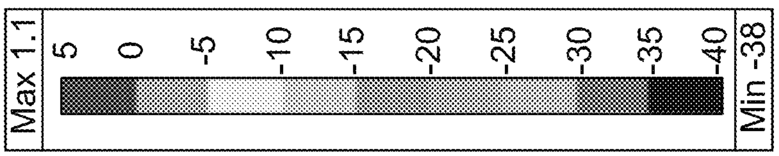

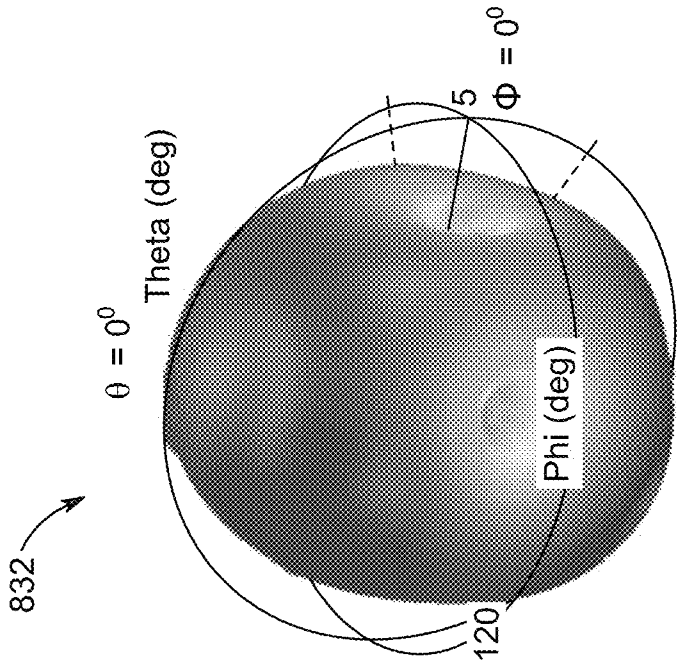
FIG. 8D
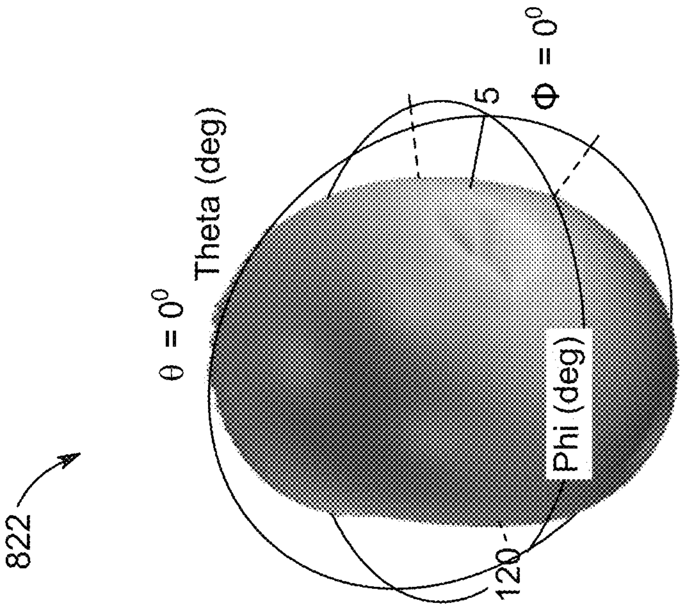
FIG. 8C
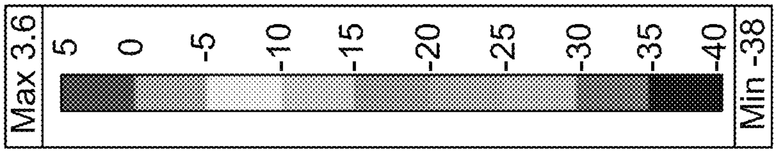

APERTURE SHARED SLOT-BASED SUB-6 GHz AND MM-WAVE IoT ANTENNA FOR 5G APPLICATIONS

CROSS REFERENCE TO RELATED APPLICATION

The present disclosure claims the benefit of U.S. Provisional Application No. 63/292,100, "APERTURE SHARED SLOT-BASED SUB-6 GHZ AND MM-WAVE IOT ANTENNA FOR 5G APPLICATIONS" filed on Dec. 21, 2021, which is incorporated herein by reference in its entirety.

STATEMENT REGARDING PRIOR DISCLOSURE BY AN INVENTOR

Aspects of the present disclosure were described in Rifaqat Hussain, "Shared-Aperture Slot-Based Sub-6-GHz and mm-Wave IoT Antenna for 5G Applications" published in IEEE Internet of Things Journal, Vol. 8, No. 13, pp. 10807-10814, 2021.

BACKGROUND

Technical Field

The present disclosure is directed to an aperture shared slot-based sub-6 GHz and mm-wave IoT antenna for 5G applications.

Description of Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

Introduction and expansion of various wireless services have resulted in a surge in the use of wireless terminals such as cell phones, tablets, and various personal digital assistants (PDAs). Wireless devices with internet connectivity and higher data throughput are demanded by users so that the wireless devices can experience multimedia and video streaming. The demand for higher data rates will continue to rise as the world is moving towards fifth-generation (5G) and sixth-generation (6G) wireless standards. Internet of Things (IoT) is a new paradigm for the next-generation 5G technology that is stated to bring connectivity to a plurality of small devices to the Internet. IoT is a platform that supports numerous interconnected wireless devices embedded with, for example, radio-frequency (RF) sensors, an electronic circuitry, and antenna systems.

A Multiple-Input Multiple-Output (MIMO) antenna is used extensively in the 5G standard, as it is compatible with the previous generation (4G). The MIMO antenna covers wide ranges and is compatible with short-range communication standards, including millimeter-wave (mm-wave) bands (having a frequency range of 30 to 300 GHz). The MIMO antenna provides ultra-high throughput over short distances, allowing real-time multimedia and video transfers, and further achieving the anticipated increase in data rates.

As the size of wireless terminals is small, space used for an antenna is fairly limited. The antenna is internally integrated into the wireless terminal. As 5G technology is developed, more and more MIMO sub-antenna units are required to be integrated into the limited space of the wireless terminal. As the number of the sub-antenna units increases, the spacing of the sub-antenna unit is reduced, such that strong surface waves and spatial inductive coupling occur between the sub-antennas, thereby deteriorating the performance of the MIMO antenna.

In order to reduce the coupling between multiple sub-antenna units, a variety of decoupling technologies have been introduced. In some examples, the coupling between antennas can be effectively reduced using technologies such as decoupling circuits and decoupling networks. However, the decoupling circuits and decoupling networks would require additional space. Further, there are also several other antenna design challenges, including its small, compact size for miniaturized IoT devices, multi-standard antenna with a low-profile structure, and reduced cost. An available IoT antenna is capable of operating at various frequency bands. These IoT antennas include low profile, compact, multi-standard IoT antennas with various sub-6-GHz frequency coverage. Such IoT antennas include printed monopoles, inverted-F antennas, loops, and patch-based designs.

Most of the available antennas for IoT applications are either working in sub-6-GHz bands or mm-wave bands. Hence, there is a need for an IoT antenna for 5G applications that can operate in wide-band operation covering both sub-6-GH band and mm-wave band.

SUMMARY

In an exemplary embodiment, an antenna system is described. The antenna system includes a substrate having a top side and a bottom side, and a single straight microstrip line on the top side of the substrate. An input end of the single straight microstrip line is adjacent and vertical to a first edge of the substrate, and an output end of the single straight microstrip line is open. The antenna system further includes a microstrip power divider (PD) on the top side of the substrate. An input end of the microstrip PD is adjacent and vertical to a second edge of the substrate, eight output ends of the microstrip PD are open, and the first edge is parallel to the second edge. The antenna system further includes a ground plane on the bottom side. Three concentric square slots are etched on the ground plane.

In another exemplary embodiment, a method of fabricating an antenna system is described. The method includes generating a single straight microstrip line on a top side of a substrate of the antenna system. An input end of the single straight microstrip line is adjacent and vertical to a first edge of the substrate, and an output end of the single straight microstrip line is open. The method further includes generating a microstrip power divider (PD) on the top side of the substrate. An input end of the microstrip PD is adjacent and vertical to a second edge of the substrate, eight output ends of the microstrip PD are open, and the first edge is parallel to the second edge. The method further includes generating a ground plane on a bottom side of the substrate. Three concentric square slots are etched on the ground plane.

In another exemplary embodiment, a non-transitory computer-readable storage medium storing a program executable by at least one processor to perform: generating a single straight microstrip line on a top side of a substrate of the antenna system, an input end of the single straight microstrip line being adjacent and vertical to a first edge of the substrate, and an output end of the single straight microstrip line being open; generating a microstrip power divider (PD)

on the top side of the substrate, an input end of the microstrip PD being adjacent and vertical to a second edge of the substrate, eight output ends of the microstrip PD being open, and the first edge being parallel to the second edge; and generating a ground plane on a bottom side of the substrate, three concentric square slots being etched on the ground plane.

The foregoing general description of the illustrative embodiments and the following detailed description thereof are merely exemplary aspects of the teachings of this disclosure, and are not restrictive.

BRIEF DESCRIPTION OF THE DRAWINGS

A more complete appreciation of this disclosure and many of the attendant advantages thereof will be readily obtained as the same becomes better understood by reference to the following detailed description when considered in connection with the accompanying drawings, wherein:

FIG. 7A is an illustration of a surface current density of the shared-aperture IoT antenna at 1.1 GHz, according to certain embodiments;

FIG. 7B is an illustration of a surface current density of the shared-aperture IoT antenna at 2.01 GHz, according to certain embodiments;

FIG. 7C is an illustration of a surface current density of the shared-aperture IoT antenna at 3.4 GHz, according to certain embodiments;

FIG. 7D is an illustration of a surface current density of the shared-aperture IoT antenna at 4.2 GHz, according to certain embodiments;

FIG. 8A is an illustration of a three-dimensional gain pattern of the antenna at 1.1 GHz, according to certain embodiments;

FIG. 8B is an illustration of a three-dimensional gain pattern of the antenna at 2.01 GHz, according to certain embodiments;

FIG. 8C is an illustration of a three-dimensional gain pattern of the antenna at 3.4 GHz, according to certain embodiments;

FIG. 8D is an illustration of a three-dimensional gain pattern of the antenna at 4.2 GHz, according to certain embodiments;

DETAILED DESCRIPTION

Figure 1A:
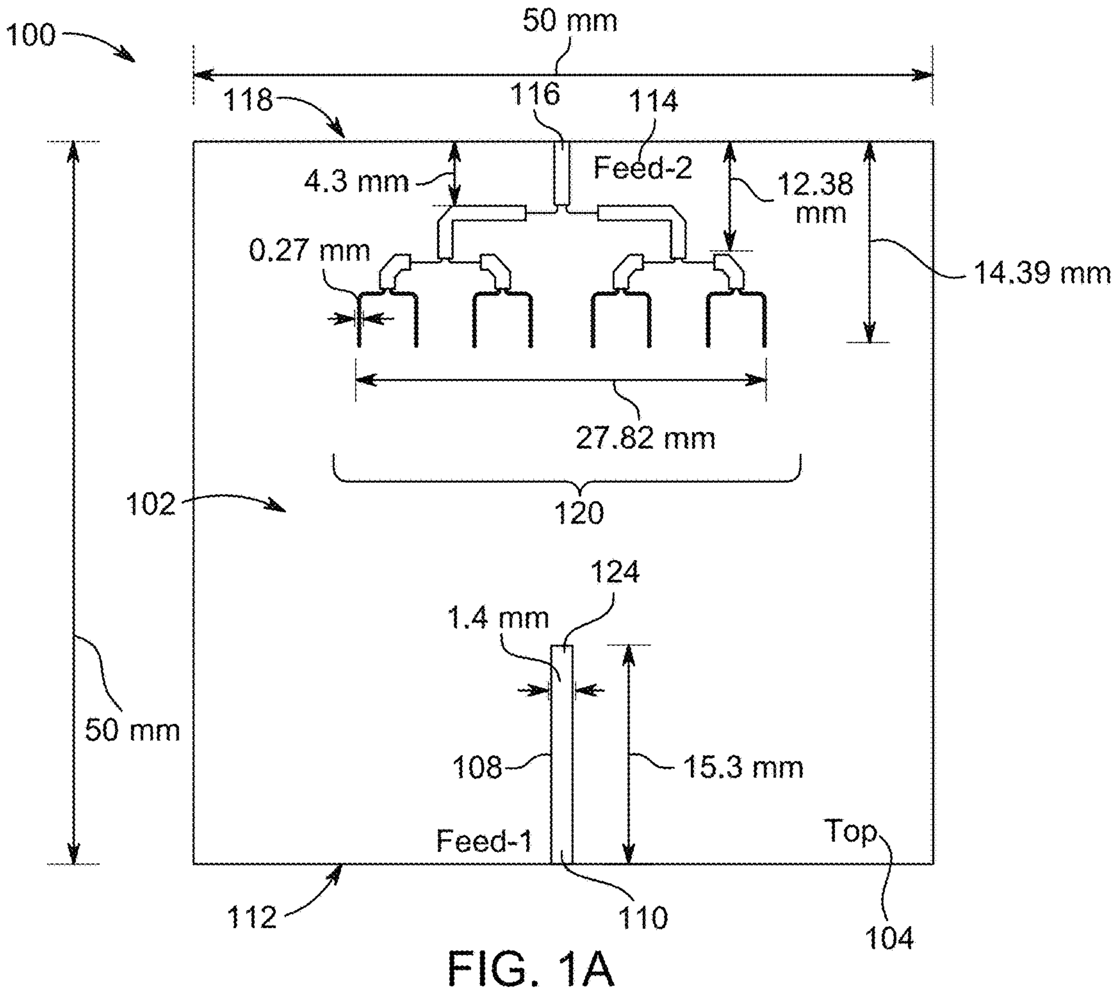
FIG. 1A illustrates a top view of a shared-aperture IoT antenna, according to certain embodiments.

In the drawings, like reference numerals designate identical or corresponding parts throughout the several views. Further, as used herein, the words "a," "an" and the like generally carry a meaning of "one or more," unless stated otherwise.

Furthermore, the terms "approximately," "approximate," "about," and similar terms generally refer to ranges that include the identified value within a margin of 20%, 10%, or preferably 5%, and any values therebetween. For example, descriptions of dimensions and/or properties such as "about 50 mm" or "about 3.48" include ranges of 50 mm±20%, 10% or 5%, and 3.48±20%, 10% or 5%, respectively.

Aspects of this disclosure are directed to an antenna system and a method of fabricating the antenna system. The present disclosure describes a square shaped concentric slot-based antenna for sub-6-GHz and millimeter-wave (mm wave) 5G-enabled Internet of Things (IoT) devices. The described antenna exhibits an octaband operation for the sub-6-GHz spectrum while it resonates at 28 GHz as well. The described antenna has a shared radiating aperture for both sub-6-GHz as well as mm-wave bands. The antenna includes three concentric square slots etched out from a ground (GND) plane dimension of 50×50×0.508 $mm^3$. For the sub-6-GHz band, the antenna is excited by a single open-ended microstrip transmission line, while 1×8 power divider (PD) is used to excite the planar connected antenna arrays at the mm-wave band. The described antenna covers eight bands for sub-6-GHz operation: 1.05-1.23 GHz; 1.4-1.55 GHz; 1.9-2.3 GHz; 2.3-2.7 GHz; 3.1-3.7 GHz; 4.04-4.511 GHz; 4.83-5.2 GHz; and 5.66-6.151 GHz. The mm-wave band covers 27.4-28.4 GHz with a minimum bandwidth (BW) of 1 GHz. The described antenna covers most of the IoT bands; thus, it is a potential candidate for next-generation 5G-enabled IoT devices.

FIG. 1A-FIG. 1D illustrate an overall configuration of a shared-aperture IoT antenna system (hereinafter interchangeably referred to as "the antenna 100"), according to one or more aspects of the present disclosure. In the drawings of FIG. 1A-FIG. 1D, dimensions shown are for example, of a 50×50 $mm^2$ substrate and should not be construed as limiting. For a substrate less than 50×50 $mm^2$, the dimensions are proportionately smaller.

Figure 1B:
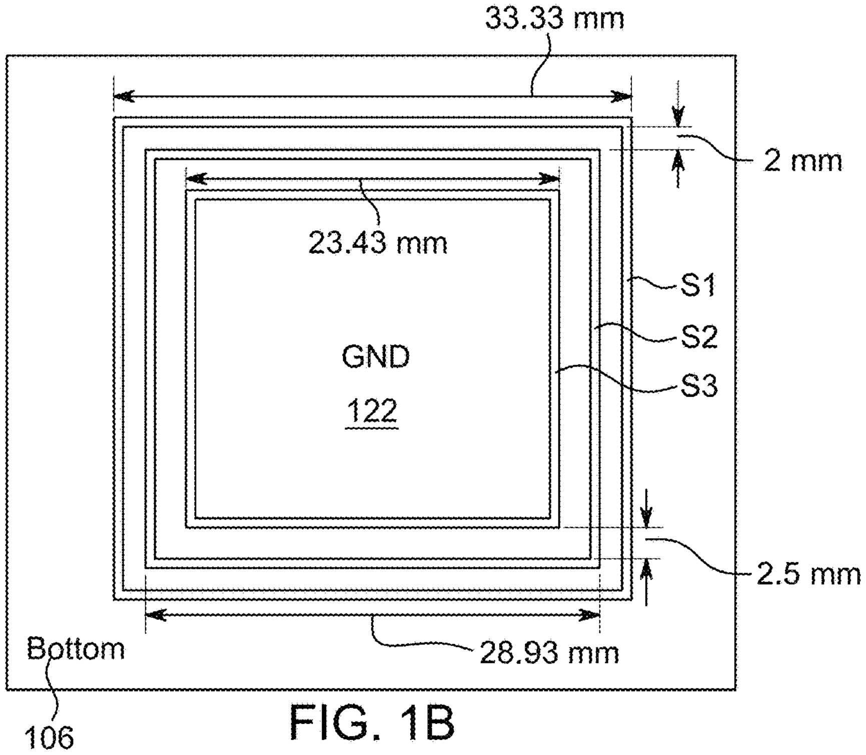
FIG. 1B illustrates a bottom view of the shared-aperture IoT antenna, according to certain embodiments.

FIG. 1A illustrates a top view of the shared-aperture IoT antenna 100. As shown in FIG. 1A, the antenna system 100 includes a substrate 102, a single straight microstrip line 108, a microstrip power divider (PD) 114, and a ground plane 122 (as shown in FIG. 1B).

The substrate 102 has a top side 104 and a bottom side 106. In an aspect, the substrate 102 is a Rogers RO4350 substrate (fabricated by Roger cooperation, located at 2225 W Chandler Blvd, Chandler, AZ 85224). The Rogers RO4350 substrate is used due to its low relative permittivity ($\varepsilon_r$) and ease of milling the substrate using an LPKF S103 (manufactured by LPKF Laser & Electronics, located at Osteriede 7, 30827 Garbsen, Germany). Further, the substrate 102 has a first edge 112 and a second edge 118. In an aspect, the first edge 112 is parallel to the second edge 118. In an aspect, the size of the substrate 102 is 50×50 $mm^2$. In some examples, the substrate 102 has a dielectric constant of 3.48, a loss tangent of 0.0036, and a thickness of 0.508 mm.

The single straight microstrip line 108 is fabricated on the top side 104 of the substrate 102 via a laser milling process for example. The single straight microstrip line 108 includes an input end 110 and an output end 124. The input end 110 is adjacent to the first edge 112 of the substrate 102. The input end 110 is also vertical (perpendicular) to the first edge 112 of the substrate 102. Further, the output end 124 of the single straight microstrip line 108 is open. In an aspect, the length of the single straight microstrip line 108 is 15.3 mm and the width of the single straight microstrip line 108 is 1.4 mm. In an aspect, the size of the single straight microstrip line is 15.3×1.4 $mm^2$. The single straight microstrip line 108 acts a feed-1 for the antenna 100 as shown in FIG. 1A. In an aspect, the input end 110 of the single straight microstrip line 108 is excited with a sub-6 GHz frequency.

The microstrip power divider (PD) 114 is also fabricated on the top side 104 of the substrate 102 using the laser milling process for example. In an aspect, the microstrip PD 114 is a cascaded 8-way power divider. The power divider is a passive device that is used to couple a defined amount of electromagnetic power in a transmission line via a port enabling the signal to be used in another circuit. In a structural aspect, the microstrip PD (1×8 power divider) 114 has an input end 116 and eight output ends 120. The input end 116 of the microstrip PD 114 is adjacent and vertical to the second edge 118 of the substrate 102. The eight output ends 120 of the microstrip PD 114 are open. The 1×8 microstrip PD 114 acts a feed-2 for the antenna 100 as shown in FIG. 1A. In an aspect, the input end 116 of the microstrip PD is excited with a millimeter-wave frequency. The antenna 100 is configured to cover eight bands for sub-6-GHz operation: 1.05-1.23 GHz; 1.4-1.55 GHz; 1.9-2.3 GHz; 2.3-2.7 GHz; 3.1-3.7 GHz; 4.04-4.511 GHz; 4.83-5.2 GHz; and 5.66-6.151 GHz. In an aspect, the distance of the eight output ends 120 from the second edge 118 of the substrate 102 is 14.39 mm. Each of the eight output ends has a width of 0.27 mm. Further, the distance between the first output end and the eighth output end is 27.82 mm. In an example, the length of the input end 116 is 4.3 mm from the second edge 118 of the substrate 102. The input end 116 is further configured to be divided into two ends. At a distance of 12.38 mm, the two subsequent ends of the input end 116 are further divided into four ends.

The ground plane 122 is fabricated on the bottom side 106 of the substrate 102 (as shown in FIG. 1B). Further, the ground plane 122 includes three concentric square slots (S1-S3), etched on the ground plane 122. For mm-wave band, the slots (S1-S3) work as a connected slot antenna array (CSAA) by using the eight output ends 120. In an aspect, the width of each of the three concentric square slots (S1-S3) is equal to 0.5 mm. In an aspect, the outer concentric square slot S1 has a length of 33.33 mm, and the middle concentric square slot S2 has a length of 28.93 mm. The spacing between S1 and S2 is 2 mm. Further, the inner square slot S3 has a length of 23.43 mm. The spacing between S2 and S3 is 2.5 mm.

Figure 1C:
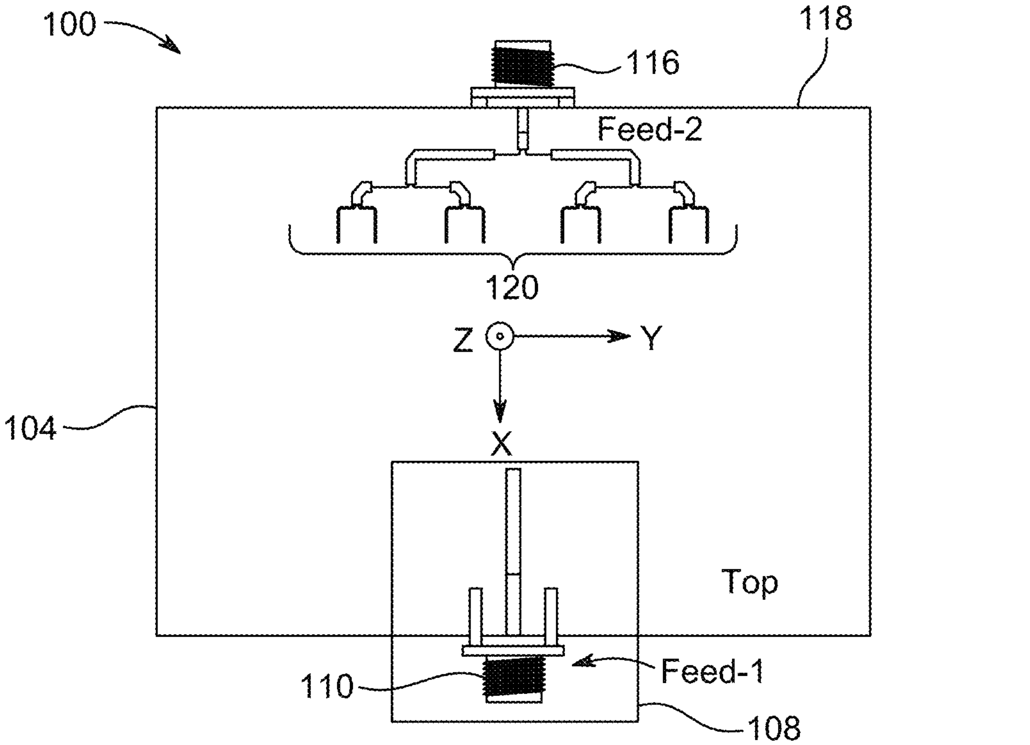
FIG. 1C illustrates a fabricated top view of the shared-aperture IoT antenna, according to certain embodiments.

FIG. 1C illustrates a fabricated top view of the shared-aperture IoT antenna 100.

Figure 1D:
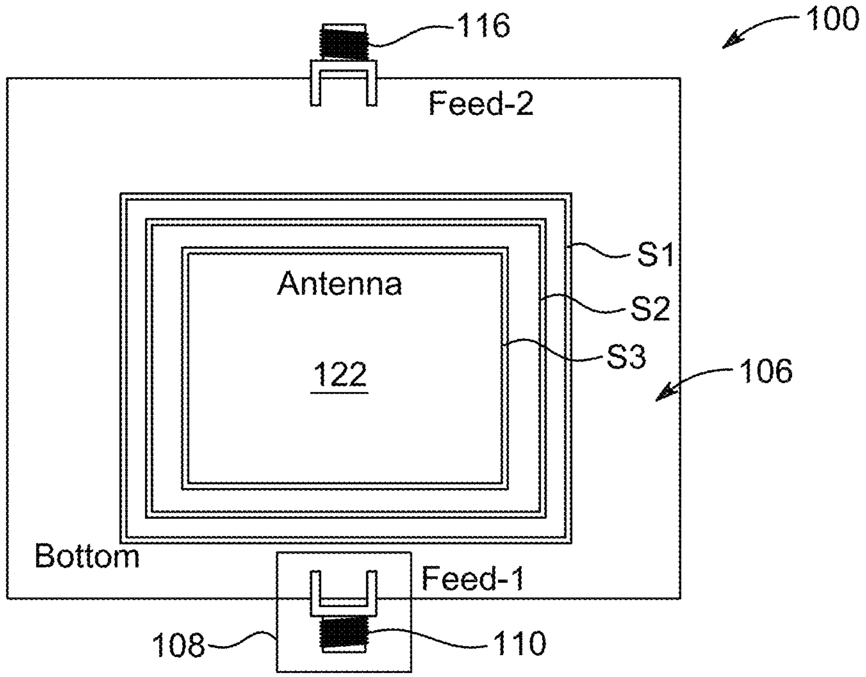
FIG. 1D illustrates is a fabricated bottom view of the shared-aperture IoT antenna, according to certain embodiments.

FIG. 1D illustrates is a fabricated bottom view of the shared-aperture IoT antenna 100. The three concentric square slots (S1-S3) are etched on the bottom side 106 of the substrate 102. The three concentric square slots (S1-S3) are used as a co-shared radiating structure for both sub-6-GHz and mm-wave bands to cover maximum 5G bands. The slot structure (S1-S3) is configured to be excited using open-ended transmission lines from both ends named as the input end 116 of the microstrip PD 114 and input end 110 of the single straight microstrip line 108. The transmission line on the one end (input end 110) excites the sub-6-GHz bands while a network of eight open-end transmission lines 120 connected through a cascaded power divider (PD) 114 on the other end (input end 116) excites the mm-wave band slot structure (S1-S3).

FIG. 2A-FIG. 2D are related to an antenna design procedure. The design procedure of the shared-aperture antenna 100 was started with an objective to cover the maximum number of sub-6-GHz 5G-enabled IoT standards along with the mm-wave band at 28 GHz. Initially, a square slot-based antenna was selected because of its simplicity, low profile structure, and potential benefits of being tuned at multiple resonating bands.

Slot-based frequency-reconfigurable (FR) antennas are selected because of their low-profile planar structure, ease of integration, and capability to be operated over a wide frequency band. Both open ended slot and closed ended slot designs have been reported in the related arts. The slot antenna with short circuited or closed ends may be modeled as λ/2 transmission line, corresponding to its fundamental resonance frequency. Such antennas may be effectively loaded with the capacitive reactance and its resonance frequencies may be changed over a wideband. The fundamental resonance frequency of the rectangular slot antenna is given by:

$$f_r = \frac{c}{2(l_2 + l_1)} \times \sqrt{\frac{\varepsilon_r + 1}{2\varepsilon_r}} \quad (1)$$

where c is the speed of light in free space, $\varepsilon_r$ is the relative permittivity of the substrate, fr is the fundamental resonance frequency of the modified rectangular ring slot antenna 100, and the term $2(l_2+l_1)$ is the mean circumference of the modified rectangular ring slot antenna 100.

Moreover, several other important parameters are also considered for the antenna design, as follows:

1) Slot dimensions of each square slot (S1-S3) correspond to the fundamental resonance frequency of each band.
2) Width and length of microstrip line: The dimension is an important factor in obtaining the octaband operation in sub-6-GHz bands with good input impedance matching.
3) The design of PD is also an important factor as the PD helps in tuning the antenna at the desired band.
4) Length and width of the substrate 102 are also important factors. Further, a sufficient clearance is required on both sides of the board such that resonating bands are not affected.

Figure 2A:
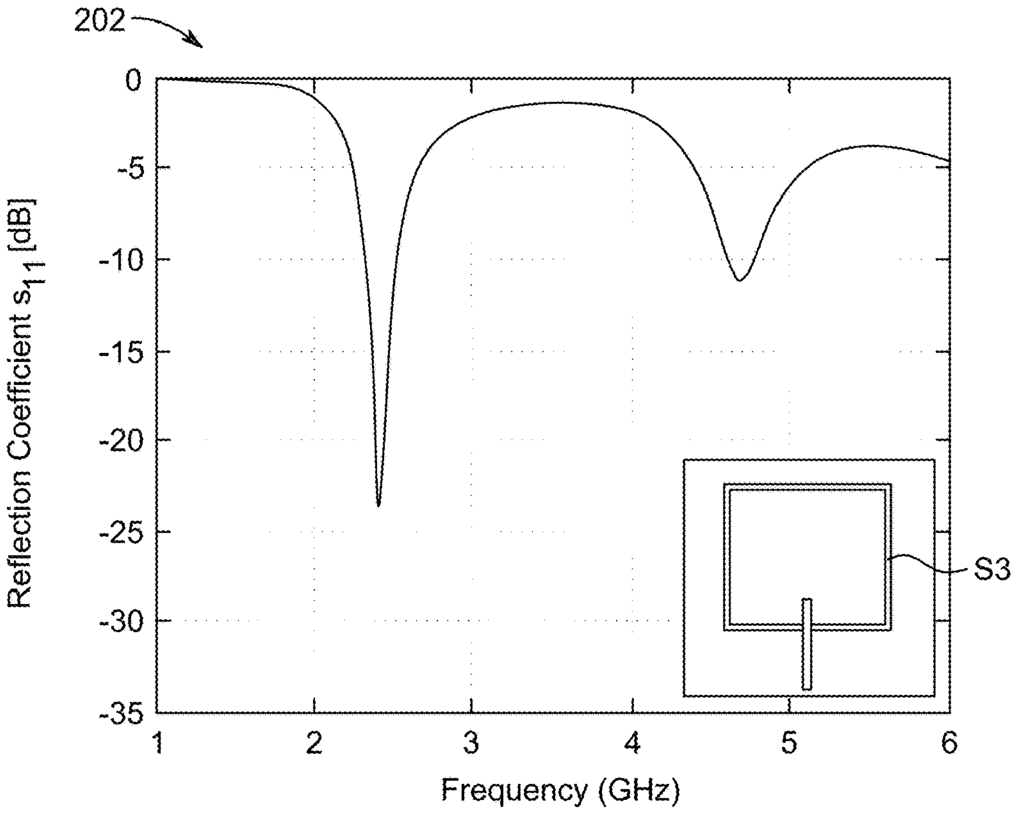
FIG. 2A illustrates a first step of an antenna design procedure for the shared-aperture IoT antenna, according to certain embodiments.

FIG. 2A illustrates a first step of the antenna design procedure including making a slot-1 (S3). The single square slot-based antenna was simulated with resonance curves (shown as 202) as shown in FIG. 2A. From FIG. 2A, it is evident that the innermost square slot (S3) resulted in dual-bands operation at 2.5 GHz and 4.7 GHz. Similarly, lower frequency bands were obtained by introducing a larger slot-line structure (S2 and S1 respectively).

Figure 2B:
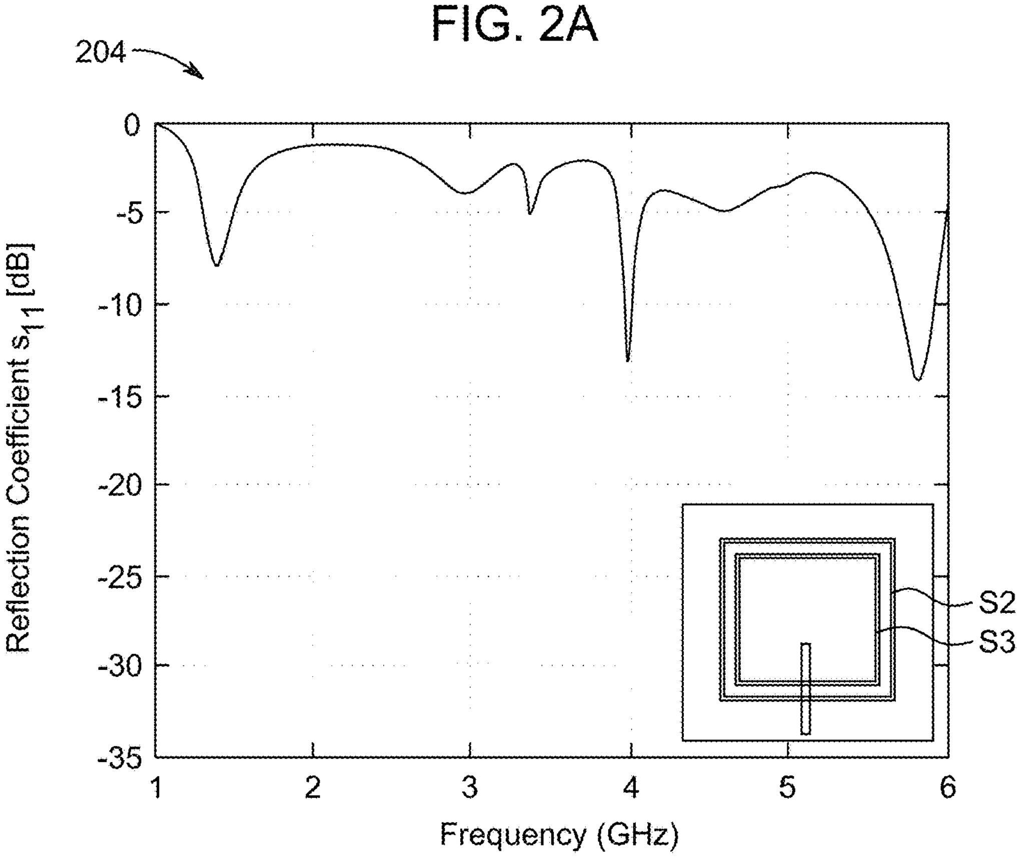
FIG. 2B illustrates a second step of the antenna design procedure, according to certain embodiments.

FIG. 2B illustrates a second step of the antenna design procedure. As shown in FIG. 2B, a larger slot line structure (S2) was fabricated outside the innermost square slot (S3) and a reflection coefficient $S_{11}$ over the frequency is calculated (as shown by 204).

Figure 2C:
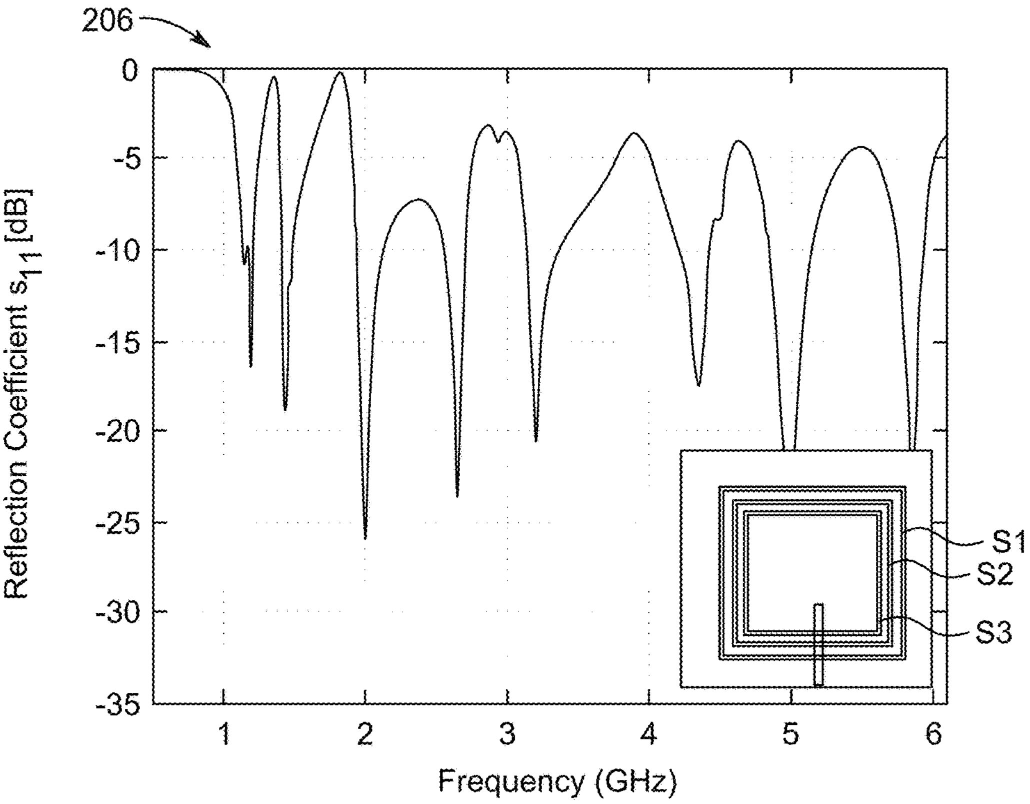
FIG. 2C illustrates a third step of the antenna design procedure, according to certain embodiments.

FIG. 2C illustrates a third step of the antenna design procedure, according to certain embodiments. As shown in FIG. 2C, an outermost slot line structure (S1) was fabricated outside the S2, and a reflection coefficient $S_{11}$ over the frequency is calculated (as shown by 206). FIGS. 2B and 2C show $S_{11}$ curves for two (S2, S3) and three concentric square slots (S1-S3), respectively. A number of parametric sweeps were performed to determine the dimensions of the antenna, appropriate placement of the antenna on the substrate 102, and resonating bands with a good input impedance matching. The width of each square slot as well as the separation between them is improved to obtain the desired performance. The $S_{11}$ curves of the improved design are shown in FIG. 2C.

Figure 2D:
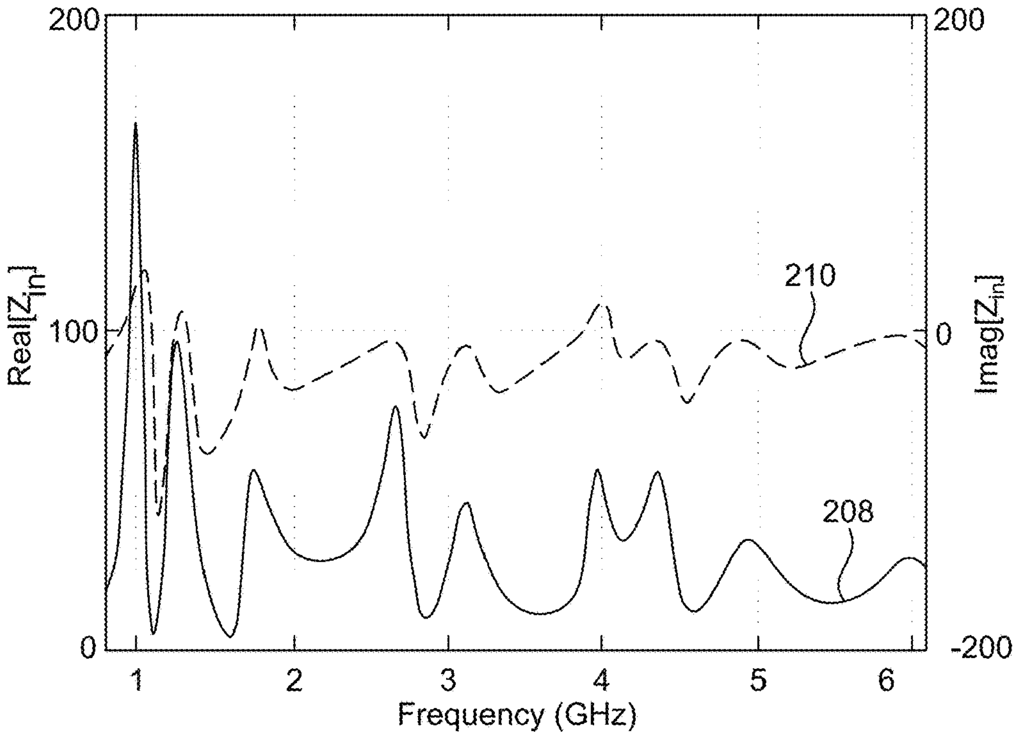
FIG. 2D illustrates a fourth step of the antenna design procedure, according to certain embodiments.

FIG. 2D illustrates a fourth step of the antenna design procedure, according to certain embodiments. A 50-Ω single straight microstrip line 108 supplied power to the square slot-line structure (S1-S3). The width of the feedline (single straight microstrip line 108) was obtained using the standard microstrip line equation available in the related arts. The width as well as length of the feedline helped in matching the input impedance $Z_{in}$. Each of the square slot-line structures (S1-S3) resonated in both its fundamental and higher order modes. The three concentric slot-line structures (S1-S3) were adjusted in such a way to cover the maximum number of 5G sub-6-GHz IoT bands. This was successfully achieved by carefully analyzing the $Z_{in}$ of the antenna system 100. The real and imaginary parts of the input impedance $Z_{in}$ of the improved antenna 100 are shown in FIG. 2D. From FIG. 2D, it can be observed that the real part of $Z_{in}$ (shown by 208) is around 50Ω, while the imaginary part of $Z_{in}$ (shown by 210) is close to zero at the resonating bands.

Figure 3:
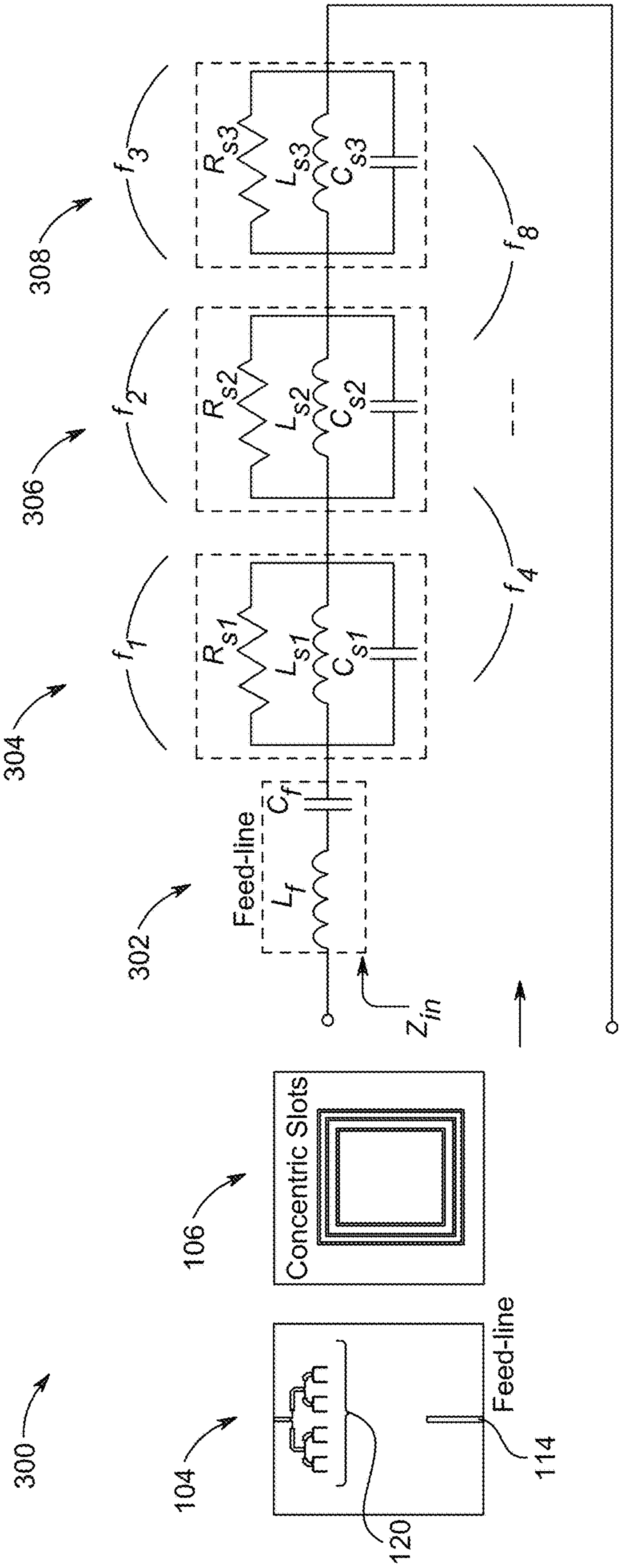
FIG. 3 illustrates a circuit model of the shared-aperture IoT antenna, according to certain embodiments.

FIG. 3 illustrates a perspective circuit model 300 of the shared-aperture IoT antenna 100, according to certain embodiments. The shared-aperture IoT antenna 100 includes the feed lines (such as 108) fabricated on the top side 104, and the square slot-line structure (S1-S3) fabricated on the bottom side 106. The equivalent circuit of each slot of the square slot-line structure was modeled as a parallel combination of an RLC circuit (shown by blocks 304, 306, and 308). The resultant equivalent circuit for the square slot-line structure is a series combination of the parallel $R_{si}L_{si}C_{si}$ circuits, where i=1, 2, or 3, corresponding to the higher-order resonance modes.

Each slot of the square slot-line structure (S1-S3) is represented by its corresponding fundamental resonating frequencies $f_1$, $f_2$, and $f_3$, while higher-order excitation modes have their corresponding resonating frequencies as $f_4, f_5, \ldots, f_8$. The microstrip line 108 may be represented by a series combination of an $L_f$, $C_f$ circuit (shown by 302) that energized the concentric square slots (S1-S3). The complete circuit diagram 300 helps in understanding the multiband operation of the concentric square slot antenna structure 100. From the circuit diagram and antenna's analysis, the octaband resonances are easily understood. The circuit element values can be extracted using the ADS simulation technique by utilizing the S-parameters of the antenna 100.

Figure 4A:
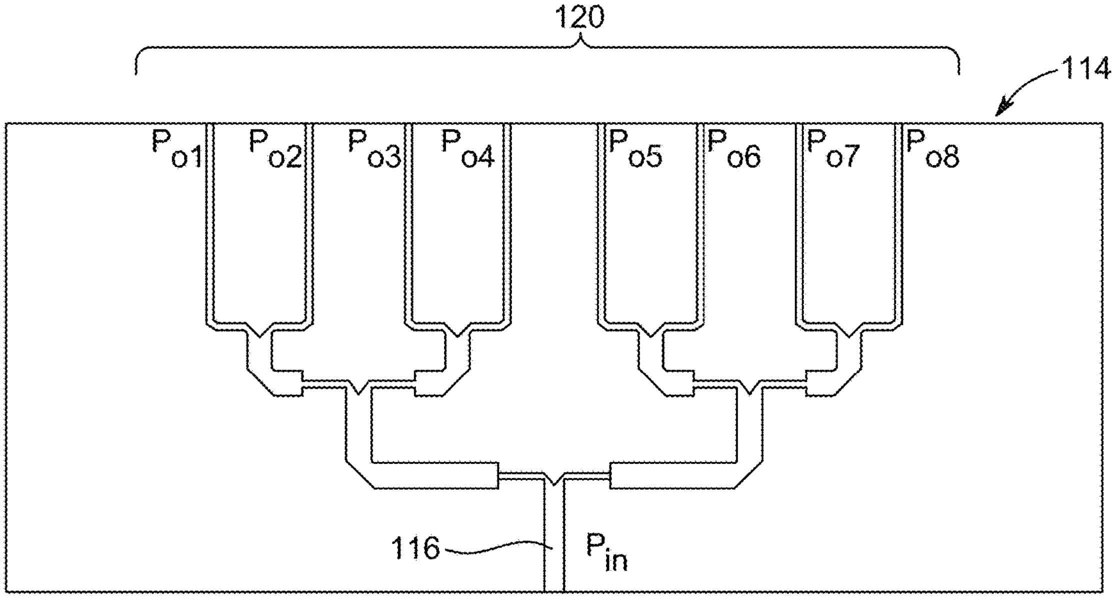
FIG. 4A is a perspective view of a microstrip power divider (PD) of the shared-aperture IoT antenna, according to certain embodiments.

FIG. 4A is a perspective view of a microstrip power divider (1×8 PD) 114 designed at 28 GHz. To feed the shared-aperture slot structure (S1-S3) of sub-6-GHz bands, a standard procedure of the power dividing mechanism is employed. The arrangement of the microstrip PD 114 is utilized to periodically feed the slot antenna structure (S1-S3). The spacing between the consecutive feed branches (eight output ends) 120 is kept at $\lambda_g/2$ at the desired mm-wave frequency band. For example, the numbers of output ports of the microstrip PD 114 are shown by ($P_{o1}$, $P_{o2}, \ldots, P_{o8}$). Thus, the microstrip PD 114 fed the slot planar connected antenna array configuration (S1-S3)

through the input end 116 ($P_{in}$). To obtain the desired characteristics of the microstrip PD 114, several parametric sweeps were performed.

Figure 4B:
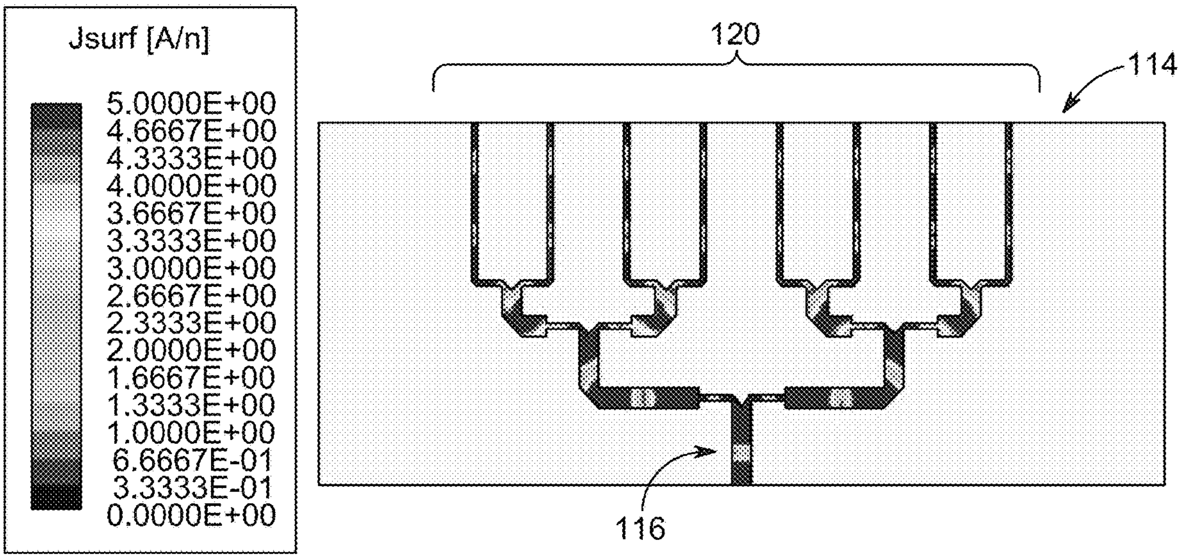
FIG. 4B illustrates current density analysis of the PD, according to certain embodiments.

FIG. 4B illustrates a current density plot of the microstrip PD 114 at 28 GHz. As shown in FIG. 4B, the power fed by the input end 116, is equally divided among all the branches (eight output ends) 120.

Figure 5A:
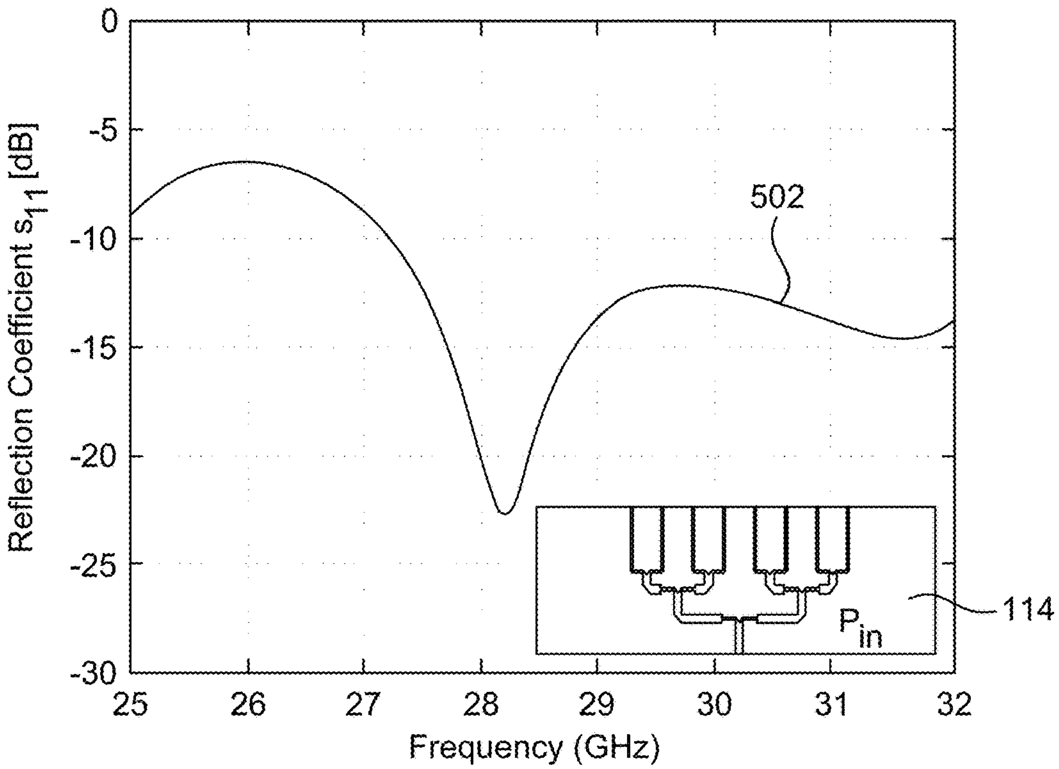
FIG. 5A is an illustration of scattering parameter $S_{11}$ of the PD, according to certain embodiments.

FIG. 5A shows a reflection curve $S_{11}$ at the input port ($P_{in}$) of the microstrip PD 114, according to certain embodiments. FIG. 5A illustrates the reflection curve $S_{11}$ (shown by 502) corresponding to FIG. 4A.

Figure 5B:
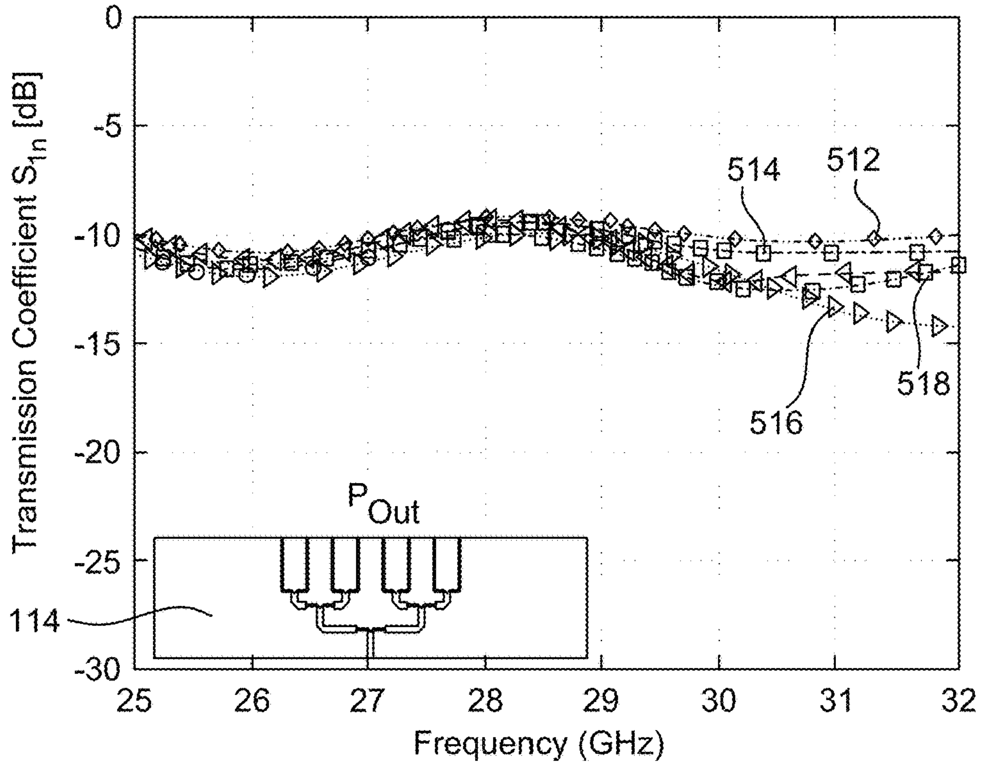
FIG. 5B is an illustration of scattering parameter $S_1n$ of the PD, according to certain embodiments.

FIG. 5B is an exemplary illustration of the scattering parameter $S_{1n}$ of the microstrip PD 114. FIG. 5B shows the transmission curves $S1_n$ at the output ports ($Po_1$, $Po_2$, . . . , $Po_8$) of the microstrip PD 114, where n=2, 3, . . . 9, is the number of output ports ($Po_1$, $Po_2$, . . . , $Po_8$) of the microstrip PD 114. For example, signal 512 illustrates the transmission curves $S_{16}$ and signal 514 illustrates the transmission curves $S_{15}$. Also, signal 516 illustrates the transmission curves $S_{18}$ and signal 518 illustrates the transmission curves $S_{17}$. It can be observed from FIG. 5B that equal power is transmitted from the input end 116 ($P_{in}$) between the frequency range of 27 to 29 GHz. This is the desired band of operation for the mm-wave antenna operation. The microstrip PD 114 as well as the connected antenna array structure (S1-S3) may be tuned to operate at other mm-wave bands of 38, 60, and 73 GHz.

EXAMPLES AND EXPERIMENTS

The following examples are provided to illustrate further and to facilitate the understanding of the present disclosure.

The shared-aperture slot-based mm-wave and sub-6-GHz antenna 100 was modeled and simulated using HFSS (High Frequency Structure Simulator). The antenna design was fabricated and characterized for S-parameters as well as for radiation patterns. All simulated and measured results are described herein:

First Experiment: Antenna Scattering Parameters

In the first experiment, the simulated and measured scattering parameters of both mm-wave and sub-6-GHz antenna designs were considered. The described sub-6-GHz antenna 100 was improved to get the maximum number of tuned bands (for example, eight bands in this case) in the sub-6-GHz spectrum, while improved performance was achieved at the mm-wave band at 28 GHz.

The improved antenna design was fabricated using an LPKF (S-103) prototyping machine (manufactured by LPKF Laser & Electronics, located at Osteriede 7, 30827 Garbsen, Germany). The scattering parameters of the antenna 100 were measured using the Agilent PNA-N5227A network analyzer (manufactured by Agilent Technologies/Keysight Technologies, located at 1400 Fountaingrove Parkway, Santa Rosa, CA 95403-1738) for both the sub-6-GHz band and the millimeter-wave band.

Figure 6A:
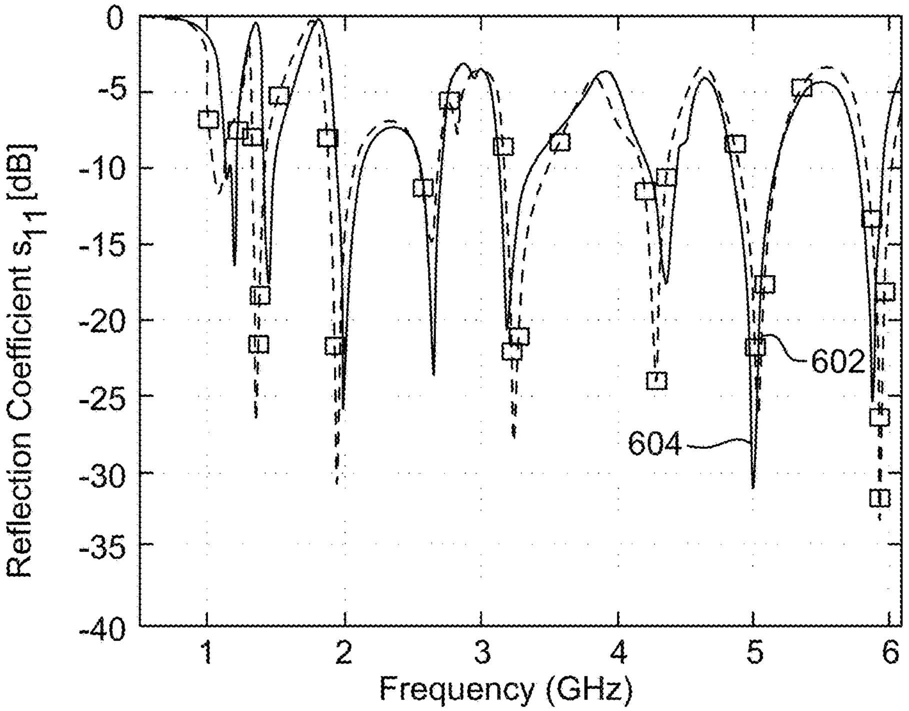
FIG. 6A is an illustration of simulated and measured scattering parameters corresponding to $S_{11}$ of the shared-aperture IoT antenna at sub-6-GHz band, according to certain embodiments.

FIG. 6A shows the simulated and measured $S_{11}$ curves for the sub-6-GHz band with the minimum −6 dB measured BW of 180 MHz over the entire band of operation. When the feed-1 is excited, the antenna acts as an octaband design with the following resonances: 1.05-1.23 GHz, 1.4-1.55 GHz, 1.9-2.3 GHz, 2.3-2.7 GHz, 3.1-3.7 GHz, 4.04-4.511 GHz, 4.83-5.2 GHz, and 5.66-6.151 GHz. For example, a signal 602 illustrates the simulated $S_{11}$ curve and a signal 604 illustrates the measured $S_{11}$ curve. The maximum gain values obtained for sub-6-GHz and mm-wave antennas were 5.2 and 8.2 dBi, respectively.

Figure 6B:
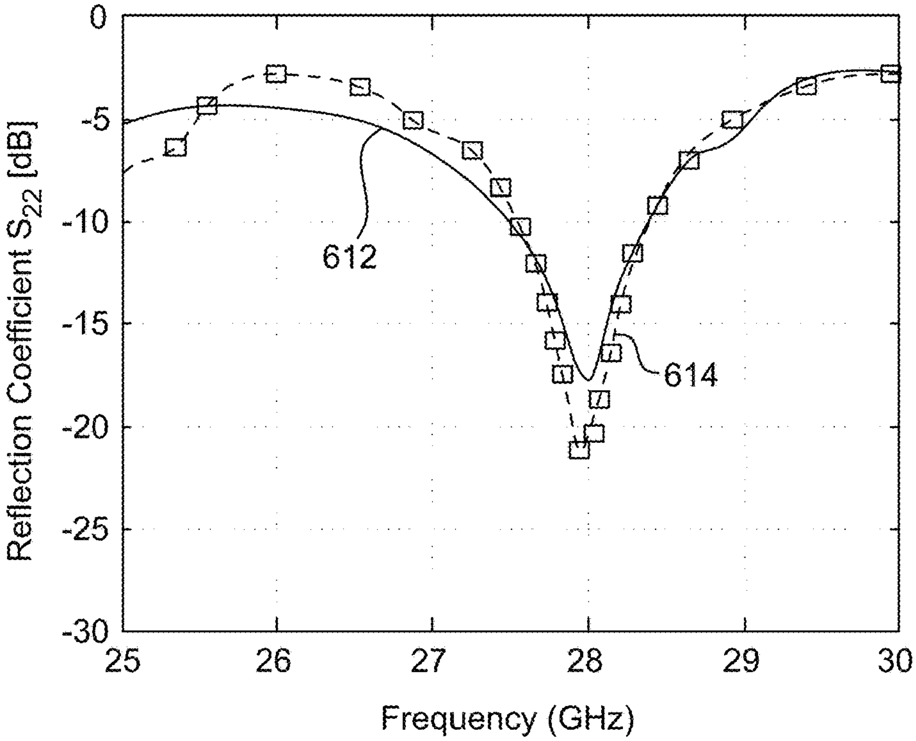
FIG. 6B is an illustration of simulated and measured scattering parameters corresponding to $S_{22}$ of the shared-aperture IoT antenna at mm-wave band, according to certain embodiments.

FIG. 6B is an exemplary illustration of simulated and measured scattering parameters corresponding to $S_{22}$ of mm-wave band. FIG. 6B shows the reflection coefficient when the feed-2 is excited, resulting in an antenna operation from 27.4 to 28.4 GHz, thereby covering the 28-GHz 5G band with a minimum −10 dB measured BW of 1 GHz. For example, a signal 612 illustrates the simulated $S_{22}$ curve, and a signal 614 illustrates the measured $S_{22}$ curve. A close agreement between the simulated and measured results was obtained, as shown in FIG. 6B. A slight variation observed was because of the fabrication tolerances and substrate properties.

Second Experiment: Current Density Analysis

In order to characterize the octaband sub-6-GHz operation of the antenna 100, the surface current distributions were investigated at various resonating bands in the second experiment. FIGS. 7A-7D show the current densities at various frequencies such as 1.1, 2.01, 3.4, and 4.2 GHz, respectively. From FIGS. 7A-7D, it is evident that the current density has different distributions along the improved antenna structure 100 at various frequency bands. FIG. 7A is an exemplary illustration 702 of the surface current density at 1.1 GHz. The maximum current variation is along the outermost slot of the antenna 100 as well as along the inner slots. The length of the current path corresponds to the first resonating band. The variations on the slot length affect the first as well as higher order resonating modes of the antenna 100.

FIG. 7B is an exemplary illustration 712 of the surface current density at 2.01 GHz (second resonant frequency band). It is clear from the FIG. 7B that the current density is higher at the same and opposite sides of the feeding structure for the outer slot line structure. The length of the current path corresponds to the resonating band at 2.01 GHz.

FIG. 7C is an exemplary illustration 722 of the surface current density at 3.4 GHz (third resonant frequency band). FIG. 7D is an exemplary illustration 732 of the surface current density at 4.2 GHz. It can be seen from FIGS. 7A-7D that the maximum current density is along the inner slots structure, which corresponds to the higher frequency bands of operation.

Third Experiment: Radiation Patterns

The antenna 100 was characterized for its radiation characteristics at different frequency bands. FIG. 8A-FIG. 8D show the simulated three-dimensional gain patterns of the antenna 100 at different sub-6-GHz frequency bands. FIG. 8A shows a three-dimensional gain pattern 802 of the antenna 100 at 1.1 GHz. FIG. 8B illustrates a three-dimensional gain pattern 812 of the antenna 100 at 2.01 GHz. FIG. 8C illustrates a three-dimensional gain pattern 822 of the antenna 100 at 3.4 GHz. FIG. 8D illustrates a three-dimensional gain pattern 832 of the antenna 100 at 4.2 GHz. As evident from FIGS. 8A-8D, the gain patterns each corresponding to a fundamental frequency mode exhibited omnidirectional behavior, while higher-order modes had multiple nulls in the gain patterns.

The maximum values of the gain for sub-6-GHz bands were varied from 1.1 to 5.3 dBi. The simulated and measured peak gain values and efficiency ($\%_{\eta}$) for the antenna 100 are shown in Table I.

TABLE I

Peak gain (PG) and efficiency (% η) values of the antenna 100

| Simulated Results | | | Simulated Results | | |
|---|---|---|---|---|---|
| $f_s$ (GHz) | PG (dBi) | % η | $f_m$ (GHz) | PG (dBi) | % η |
| 1.1 | 1.1 | 65 | 1.05 | 0.9 | 62 |
| 1.5 | 1.55 | 70 | 1.45 | 1.35 | 68 |
| 2.01 | 1.8 | 75 | 2.0 | 1.72 | 72 |
| 2.5 | 2.7 | 81 | 2.52 | 2.43 | 76 |
| 3.4 | 3.6 | 85 | 3.45 | 3.2 | 81 |
| 4.2 | 4.6 | 87 | 4.17 | 4.35 | 84 |
| 5.2 | 4.9 | 90 | 5.25 | 4.47 | 86 |
| 5.8 | 5.3 | 92 | 5.8 | 4.49 | 87 |
| 28.0 | 10.9 | 90 | 28.0 | 10.2 | 86 |

For both bands, i.e., sub-6-GHz and the mm-wave bands, the antenna efficiency (%η) is between 65% and 92%. The design of the antenna 100 is the multiband antenna design. Each concentric slot (S1-S3) resonates at the fundamental and higher-order modes. The $\%_\eta$ of the fundamental mode is higher than the higher-order modes. The described antenna 100 operates in the fundamental mode at 5.8 GHz, while the higher-order mode operates at 28 GHz.

Figure 9:
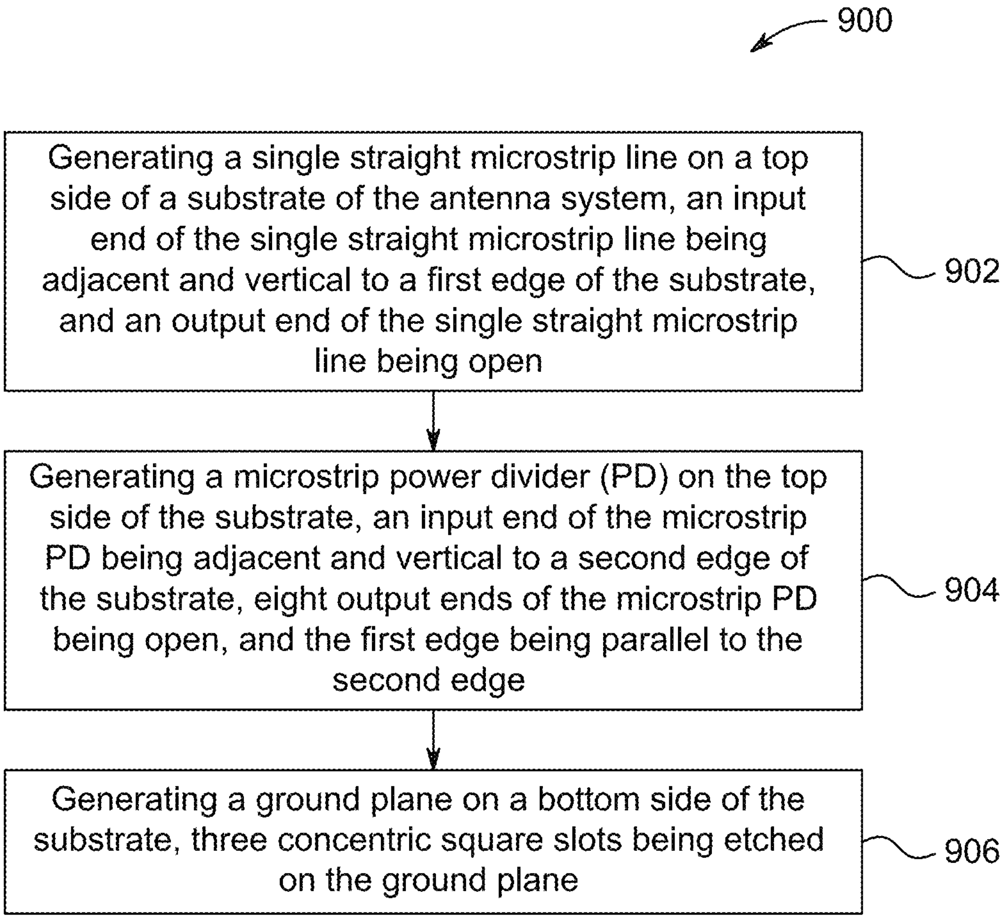
FIG. 9 is a flowchart of fabricating the shared-aperture IoT, according to certain embodiments.

FIG. 9 is an exemplary flowchart 900 of fabricating the antenna system 100, according to certain embodiments. The process in the flowchart 900 can be executed by computer hardware such as a controller 1400 in FIG. 14, a data processing system 1500 in FIG. 15, a processor 1530 in FIG. 15 and FIG. 16, distributed components in FIG. 17, and the like. The process in the flowchart 900 can also be implemented in software instructions, thus when the computer hardware executes the software instructions, the computer hardware performs the process in the flowchart 900.

Step 902 includes generating a single straight microstrip line 108 on a top side 104 of a substrate 102 of the antenna system 100. An input end 110 of the single straight microstrip line 108 is adjacent and vertical to a first edge 112 of the substrate 102, and an output end 124 of the single straight microstrip line 108 is open. In an aspect, a dielectric constant of the substrate 102 is 3.48, a loss tangent of the substrate 102 is 0.0036, and a thickness of the substrate 102 is 0.508 mm. In an aspect, a size of the single straight microstrip line is 15.3×1.4 $mm^2$. For the sub-6-GHz band, the antenna 100 is excited by the single open-ended microstrip transmission line 108.

Step 904 includes generating a microstrip power divider (PD) 114 on the top side 104 of the substrate 102. An input end 116 of the microstrip PD 114 is adjacent and vertical to a second edge 118 of the substrate 102, eight output ends 120 of the microstrip PD 114 are open, and the first edge 112 is parallel to the second edge 118. In an aspect, the microstrip PD 114 is a cascaded 8-way power divider. In an aspect, a size of the substrate 102 is 50×50 $mm^2$. The 1×8 power divider (PD) 114 is used to excite the planar connected antenna arrays at the mm-wave band.

In an aspect, the input end 110 of the single straight microstrip line 108 is excited with a sub-6 GHz frequency, and the input end 116 of the microstrip PD 114 is excited with a millimeter-wave frequency.

Step 906 includes generating a ground plane 122 on a bottom side 106 of the substrate 102. Three concentric square slots (S1-S3) are etched on the ground plane 122. In an aspect, lengths of the three concentric square slots (S1-S3) are 33.33 mm, 28.93 mm, and 23.43 mm, respectively, the widths of the three concentric square slots (S1-S3) are all 0.5 mm, and spaces between every two adjacent concentric square slots are 2 mm and 2.5 mm, respectively.

Figure 10:
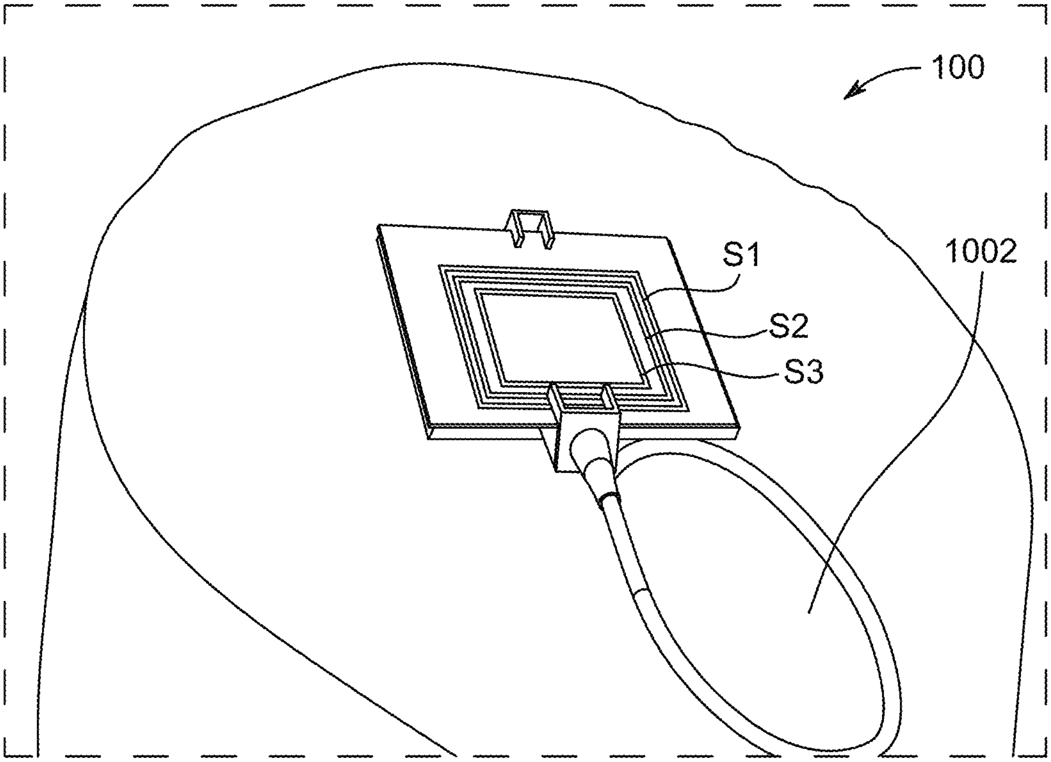
FIG. 10 is an experimental setup for measuring patterns of the shared-aperture IoT antenna, according to certain embodiments.

FIG. 10 is an experimental setup for measuring patterns of radiation characteristics of the antenna 100, according to certain embodiments. The radiation characteristics of the antenna 100 were validated through measurements. The measurement setup, as shown in FIG. 10, is placed inside the SATIMO StarLab anechoic chamber. In this experimental setup, several near-field probes were being utilized to obtain the radiated near field, which was then converted to the antenna far-field patterns. The other antenna parameters, including gain and efficiencies, were also calculated using the same procedure. For the antenna 100, the measurement procedure was started by calibrating the anechoic chamber using standard horn antennas. Each antenna element was measured for the radiation characteristics while the second port (1002) was terminated with 50-Ω impedance. The efficiencies were measured using the gain directivity method. The simulated and measured 2-D gain patterns at various sub-6-GHz bands are shown in FIGS. 11 and 12. The total gain patterns for sub-6-GHz at 1.1, 2.01, 3.4, and 4.2 GHz are shown in FIGS. 11A-D, respectively.

Figure 11A:
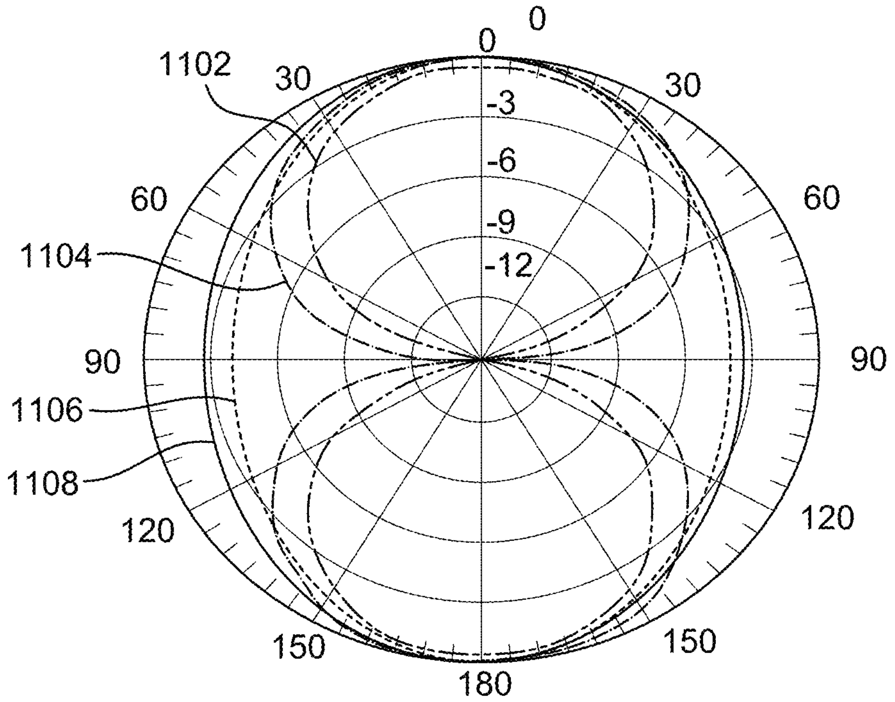
FIG. 11A is an illustration of simulated and measured total gain patterns of the shared-aperture IoT antenna for $\phi=0°$ and $\phi=90°$ at 1.1 GHz, according to certain embodiments.

FIG. 11A is an exemplary illustration of simulated and measured total gain patterns for ϕ=0° and ϕ=90° at 1.1 GHz. Signal 1102 illustrates the simulated gain in yz-plane. Signal 1104 illustrates the measured gain in yz-plane. Signal 1106 illustrates the simulated gain in xz-plane. Signal 1108 illustrates the measured gain in xz-plane.

Figure 11B:
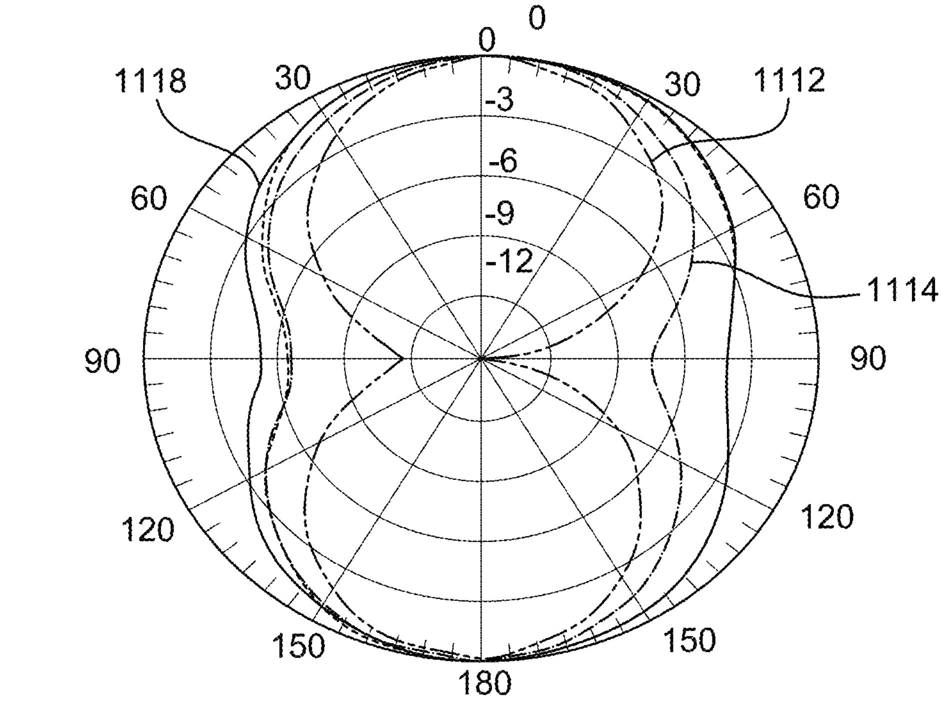
FIG. 11B is an illustration of simulated and measured total gain patterns of the shared-aperture IoT antenna for $\phi=0°$ and $\phi=90°$ at 2.01 GHz, according to certain embodiments.

FIG. 11B is an exemplary illustration of simulated and measured total gain patterns for ϕ=0° and ϕ=90° at 2.01 GHz. Signal 1112 illustrates the simulated gain in yz-plane. Signal 1114 illustrates the measured gain in yz-plane. Signal 1116 illustrates the simulated gain in xz-plane. Signal 1118 illustrates the measured gain in xz-plane.

Figure 11C:
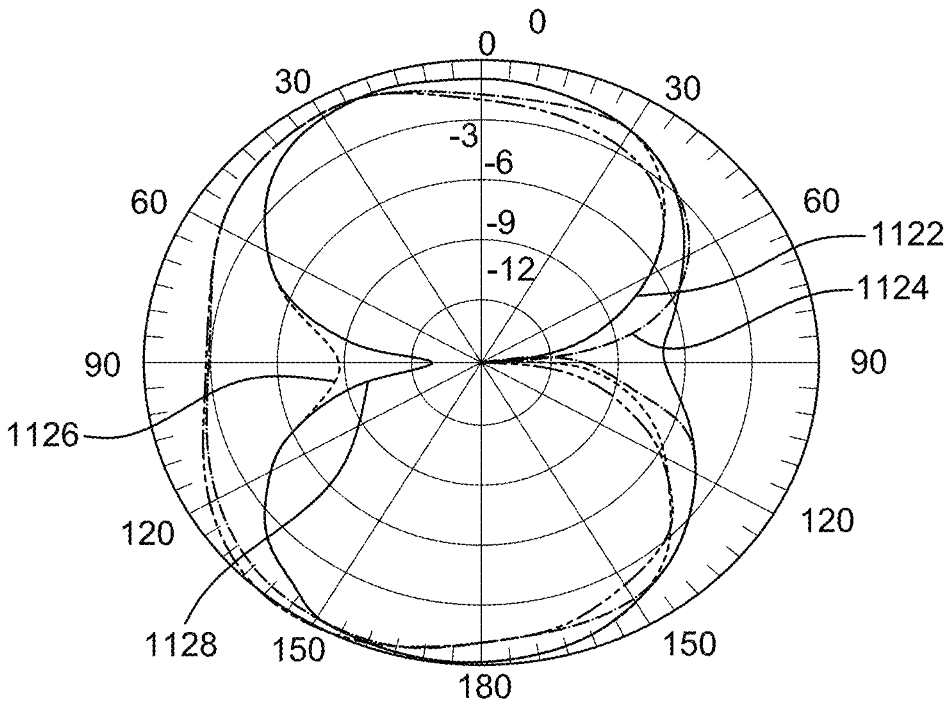
FIG. 11C is an illustration of simulated and measured total gain patterns of the shared-aperture IoT antenna for $\phi=0°$ and $\phi=90°$ at 3.4 GHz, according to certain embodiments.

FIG. 11C is an exemplary illustration of simulated and measured total gain patterns for ϕ=0° and ϕ=90° at 3.4 GHz. Signal 1122 illustrates the simulated gain in yz-plane. Signal 1124 illustrates the measured gain in yz-plane. Signal 1126 illustrates the simulated gain in xz-plane. Signal 1128 illustrates the measured gain in xz-plane.

Figure 11D:
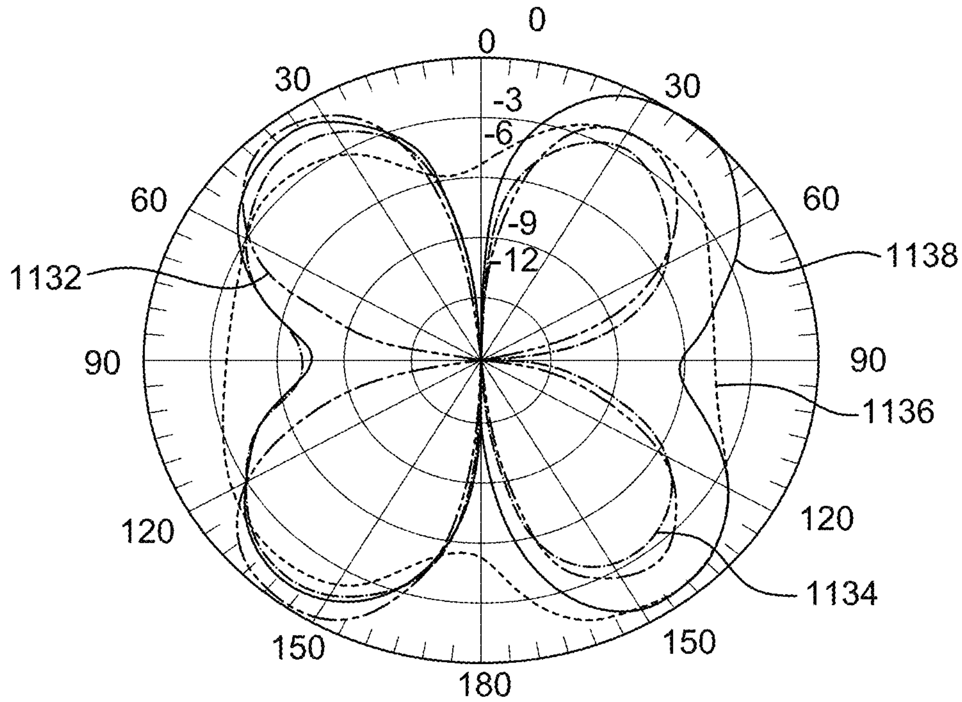
FIG. 11D is an illustration of simulated and measured total gain patterns of the shared-aperture IoT antenna for $\phi=0°$ and $\phi=90°$ at 4.2 GHz, according to certain embodiments.

FIG. 11D is an exemplary illustration of simulated and measured total gain patterns for ϕ=0° and ϕ=90° at 4.2 GHz. Signal 1132 illustrates the simulated gain in yz-plane. Signal 1134 illustrates the measured gain in yz-plane. Signal 1136 illustrates the simulated gain in xz-plane. Signal 1138 illustrates the measured gain in xz-plane. In FIGS. 11A-D, it can be seen that the antenna 100 was behaving as an omnidirectional antenna at the fundamental mode of each slot line.

Figure 12A:
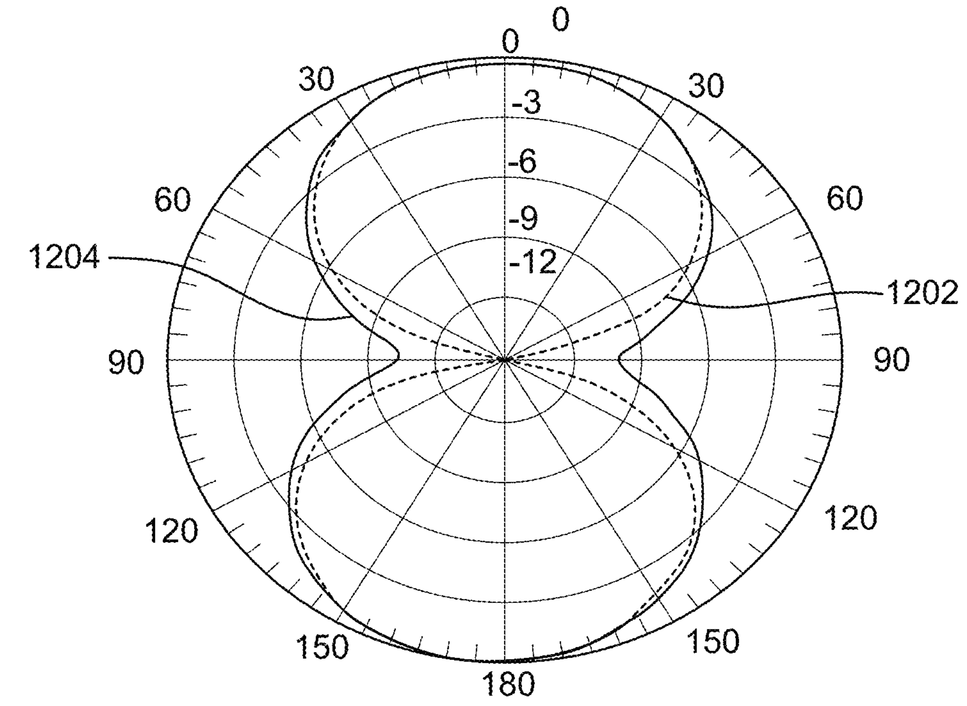
FIG. 12A is an illustration of simulated and measured total gain patterns of the shared-aperture IoT antenna for $\theta=90°$ at 1.1 GHz, according to certain embodiments.

Similarly, FIGS. 12A-D shows the simulated and measured patterns for θ=90°. FIG. 12A is an exemplary illustration of simulated and measured total gain patterns for θ=90° at 1.1 GHz. Signal 1202 illustrates the simulated gain in xy-plane. Signal 1204 illustrates the measured gain in xy-plane.

Figure 12B:
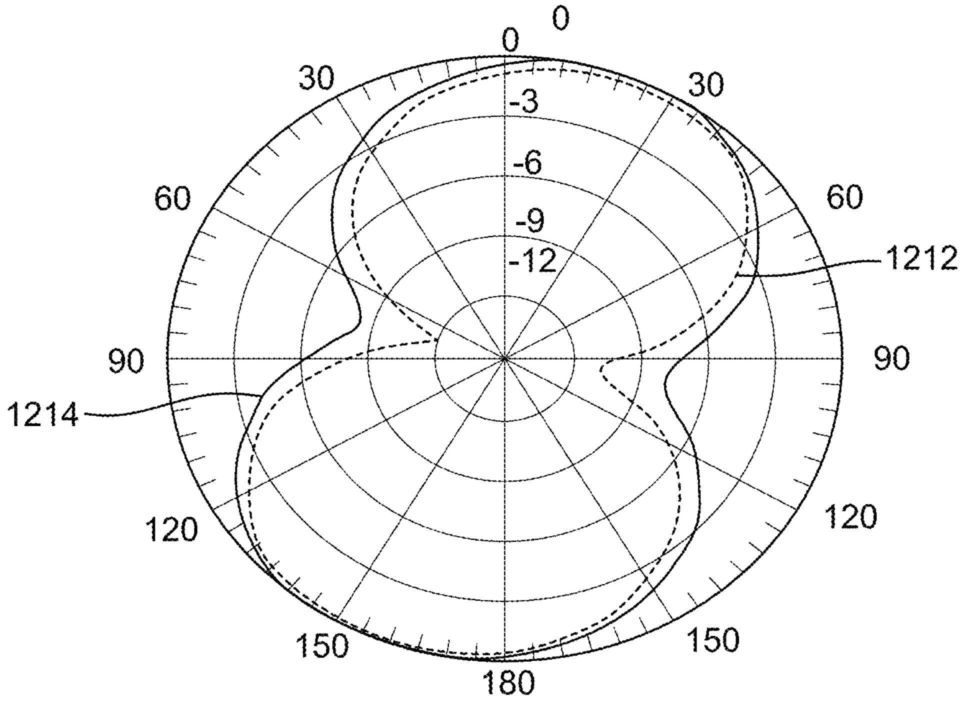
FIG. 12B is an illustration of simulated and measured total gain patterns of the shared-aperture IoT antenna for $\theta=90°$ at 2.01 GHz, according to certain embodiments.
Figure 12C:
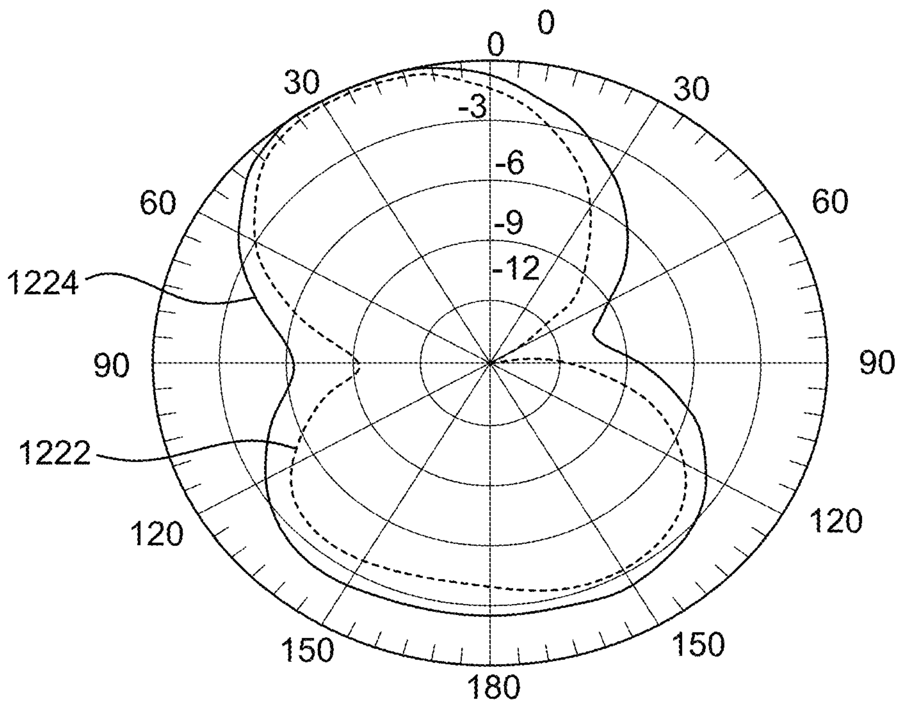
FIG. 12C is an illustration of simulated and measured total gain patterns of the shared-aperture IoT antenna for $\theta=90°$ at 3.4 GHz, according to certain embodiments.
Figure 12D:
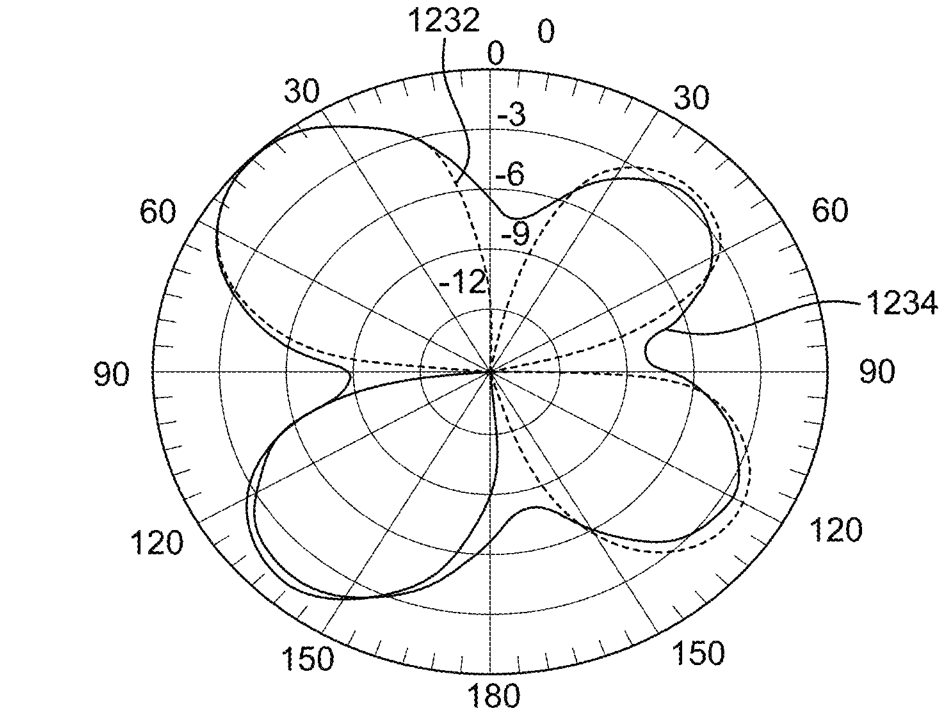
FIG. 12D is an illustration of simulated and measured total gain patterns of the shared-aperture IoT antenna for $\theta=90°$ at 4.2 GHz, according to certain embodiments.

FIG. 12B is an exemplary illustration of simulated and measured total gain patterns for θ=90° at 2.01 GHz. Signal 1212 illustrates the simulated gain in xy-plane. Signal 1214 illustrates the measured gain in xy-plane. Further, FIG. 12C is an exemplary illustration of simulated and measured total gain patterns for θ=90° at 3.4 GHz. Signal 1222 illustrates the simulated gain in xy-plane. Signal 1224 illustrates the measured gain in xy-plane. Also, FIG. 12D is an exemplary illustration of simulated and measured total gain patterns for θ=90° at 4.2 GHz. Signal 1232 illustrates the simulated gain in xy-plane. Signal 1234 illustrates the measured gain in xy-plane.

Figure 13A:
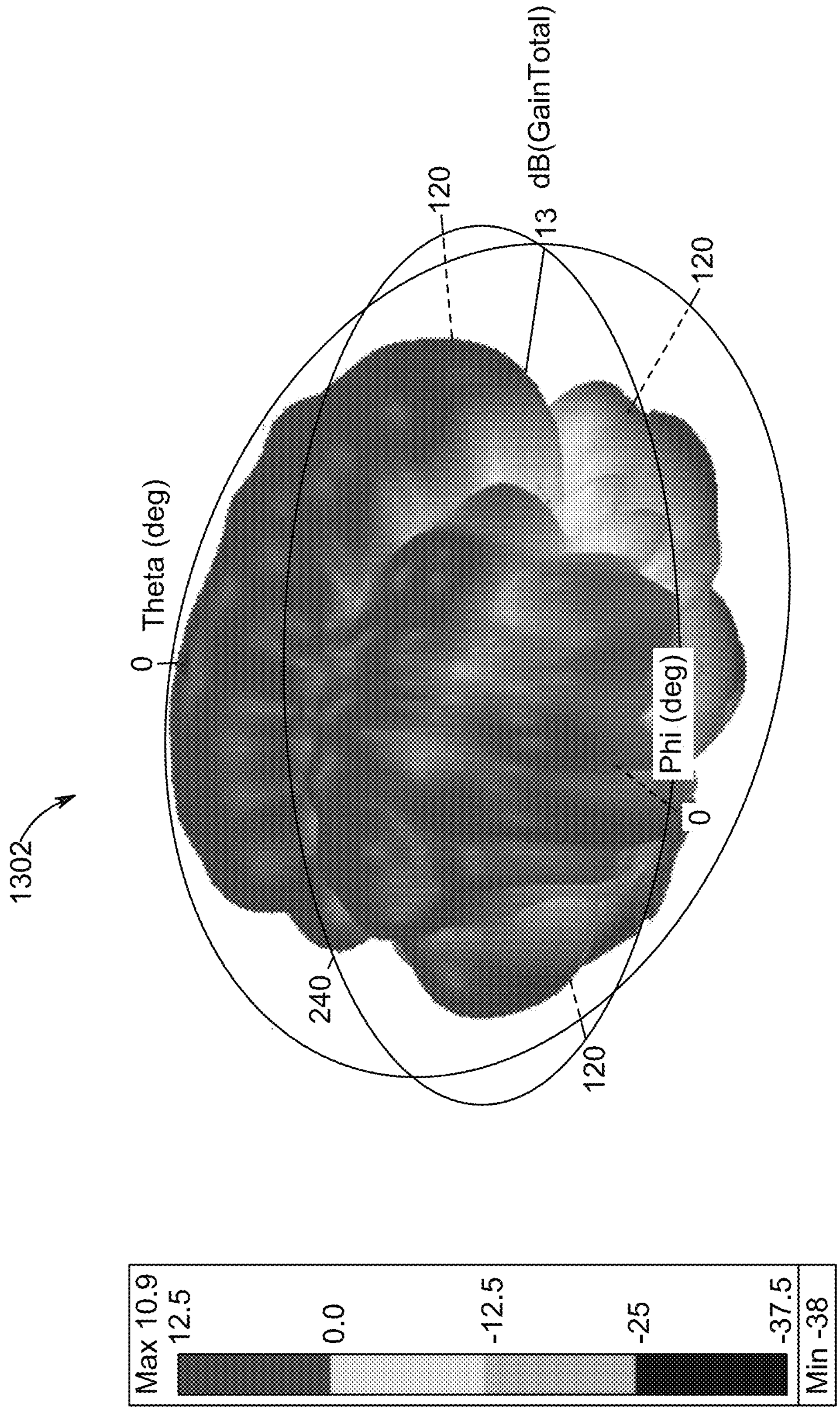
FIG. 13A is an illustration of normalized three-dimensional gain patterns of the shared-aperture IoT antenna at 28 GHz, according to certain embodiments.
Figure 13B:
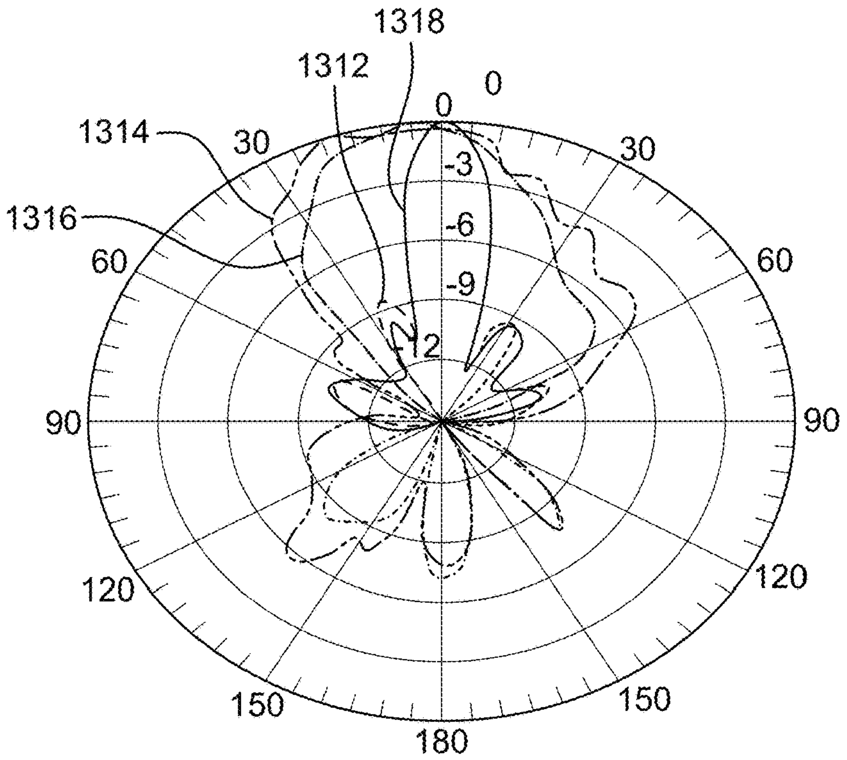
FIG. 13B is an illustration of 2-D gain patterns of the shared-aperture IoT antenna at 28 GHz for $\phi=0°$ and $\phi=90°$, according to certain embodiments.
Figure 13C:
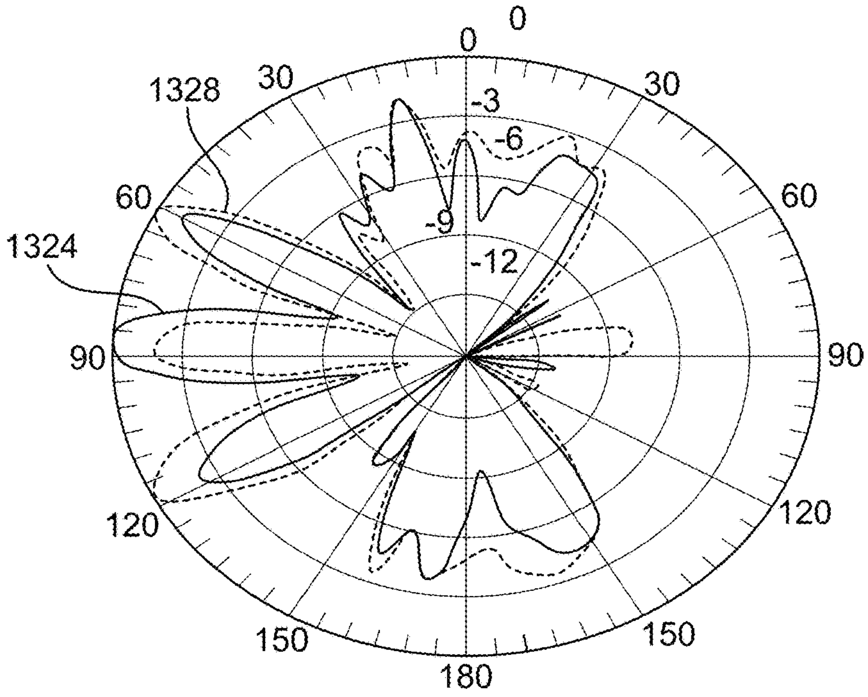
FIG. 13C is an illustration of 2-D gain patterns of the shared-aperture IoT antenna at 28 GHz for $\theta=90°$, according to certain embodiments.

The radiation characteristics of the shared-aperture slot-based antenna design at the mm-wave band are shown in FIGS. 13A-C. FIG. 13A is an exemplary illustration of a normalized three-dimensional gain pattern at 28 GHz. Signal 1302 shows the 3-D gain pattern of the antenna 100 with the peak gain value of 10.9 dBi at 28 GHz.

FIG. 13B is an exemplary illustration of simulated and measured 2-D gain patterns at 28 GHz for $\phi=0°$ and $\phi=90°$. Signal 1312 illustrates the measured gain in xz-plane. Signal 1314 illustrates the stimulated gain in yz-plane. Signal 1316 illustrates the simulated gain in yz-plane. Signal 1318 illustrates the stimulated gain in xz-plane.

FIG. 13C is an exemplary illustration of simulated and measured 2-D gain patterns at 28 GHz for $\theta=90°$. Signal 1324 illustrates the measured gain in xy-plane. Signal 1328 illustrates the simulated gain in xy-plane.

As shown in FIGS. 13A-C, a good agreement between the simulated and measured results was obtained. A slight difference in the simulated and measured results is mainly because of the substrate properties, connector modeling in HFSS, soldering effects, and fabrication tolerances.

Specifically, the main reasons for the slight differences in the simulated and measured results are because of several reasons listed as:

1) Fabrication Tolerances: Differences in the dimensions of the antenna due to fabrication may affect the results.
2) Different $\varepsilon_r$ Values: Any difference in the $\varepsilon_r$ values of the same substrate might result in large deviation in antenna geometry at mm-wave bands.
3) Connectors Soldering: The slight variation in manual soldering introduced noise that may change the antenna characteristics.
4) Selecting Antennas Material: To achieve high performance of antennas implementation, it is desirable to enhance the radiation efficiency and robustness of the board. This reduces the flexibility of selecting any particular material for the antenna design.
5) Mass Production of Antenna Designs: Consistency in the production of antenna designs is highly desirable.

Also, an IoT antenna design operating at the sub-1-GHz band with a compact form factor, is a challenging requirement. Such an integrated low-profile antenna solution at sub-1 GHz and mm-wave will be highly recommended in futuristic devices.

The first embodiment is illustrated with respect to FIGS. 1-9. The first embodiment describes the antenna system 100. The antenna system 100 includes a substrate 102 having a top side 104 and a bottom side 106, and a single straight microstrip line 108 on the top side 104 of the substrate 102. An input end 110 of the single straight microstrip line 108 is adjacent and vertical to a first edge 112 of the substrate 102, and an output end 124 of the single straight microstrip line 108 is open. The antenna system 100 further includes a microstrip power divider (PD) 114 on the top side 104 of the substrate 102. An input end 116 of the microstrip PD 114 is adjacent and vertical to a second edge 118 of the substrate 102, eight output ends 120 of the microstrip PD 114 are open, and the first edge 112 is parallel to the second edge 118. The antenna system 100 further includes a ground plane 122 on the bottom side 106. Three concentric square slots (S1-S3) are etched on the ground plane 122.

In an aspect, a dielectric constant of the substrate 102 is 3.48, a loss tangent of the substrate 102 is 0.0036, and a thickness of the substrate 102 is 0.508 mm.

In an aspect, the microstrip PD 114 is a cascaded 8-way power divider.

In an aspect, a size of the substrate 102 is 50×50 $mm^2$.

In an aspect, a size of the single straight microstrip line 108 is 15.3×1.4 $mm^2$.

In an aspect, lengths of the three concentric square slots (S1-S3) are 33.33 mm, 28.93 mm, and 23.43 mm, respectively, widths of the three concentric square slots (S1-S3) are all 0.5 mm, and spaces between every two adjacent concentric square slots are 2 mm and 2.5 mm, respectively.

In an aspect, the input end 110 of the single straight microstrip line 108 is excited with a sub-6 GHz frequency, and the input end 116 of the microstrip PD 114 is excited with a millimeter-wave frequency.

The second embodiment is illustrated with respect to FIGS. 1-9. The second embodiment describes a method of fabricating an antenna system. The method includes generating a single straight microstrip line on a top side of a substrate of the antenna system. An input end of the single straight microstrip line is adjacent and vertical to a first edge of the substrate, and an output end of the single straight microstrip line is open. The method further includes generating a microstrip power divider (PD) on the top side of the substrate. An input end of the microstrip PD is adjacent and vertical to a second edge of the substrate, eight output ends of the microstrip PD are open, and the first edge is parallel to the second edge. The method further includes generating a ground plane on a bottom side of the substrate. Three concentric square slots (S1-S3) are etched on the ground plane.

In an aspect of the present disclosure, a dielectric constant of the substrate is 3.48, a loss tangent of the substrate is 0.0036, and a thickness of the substrate is 0.508 mm.

In an aspect of the present disclosure, the microstrip PD is a cascaded 8-way power divider.

In an aspect of the present disclosure, a size of the substrate is 50×50 $mm^2$.

In an aspect of the present disclosure, a size of the single straight microstrip line is 15.3×1.4 $mm^2$.

In an aspect of the present disclosure, lengths of the three concentric square slots are 33.33 mm, 28.93 mm, and 23.43 mm, respectively, widths of the three concentric square slots are all 0.5 mm, and spaces between every two adjacent concentric square slots are 2 mm and 2.5 mm, respectively.

In an aspect of the present disclosure, the input end of the single straight microstrip line is excited with a sub-6 GHz frequency, and the input end of the microstrip PD is excited with a millimeter-wave frequency.

The third embodiment is illustrated with respect to FIGS. 1-9. The third embodiment describes a non-transitory computer-readable storage medium storing a program executable by at least one processor to perform: generating a single straight microstrip line on a top side of a substrate of the antenna system, an input end of the single straight microstrip line being adjacent and vertical to a first edge of the substrate, and an output end of the single straight microstrip line being open; generating a microstrip power divider (PD) on the top side of the substrate, an input end of the microstrip PD being adjacent and vertical to a second edge of the substrate, eight output ends of the microstrip PD being open, and the first edge being parallel to the second edge; and generating a ground plane on a bottom side of the substrate, three concentric square slots (S1-S3) being etched on the ground plane.

In an aspect, a dielectric constant of the substrate is set as 3.48, a loss tangent of the substrate is set as 0.0036, and a thickness of the substrate is set as 0.508 mm.

In an aspect, the microstrip PD is generated as a cascaded 8-way power divider.

In an aspect, a size of the substrate is set as 50×50 $mm^2$.

In an aspect, a size of the single straight microstrip line is set as 15.3×1.4 $mm^2$.

In an aspect, lengths of the three concentric square slots are set as 33.33 mm, 28.93 mm, and 23.43 mm, respectively, widths of the three concentric square slots are all set as 0.5 mm, and spaces between every two adjacent concentric square slots are set as 2 mm and 2.5 mm, respectively.

Figure 14:
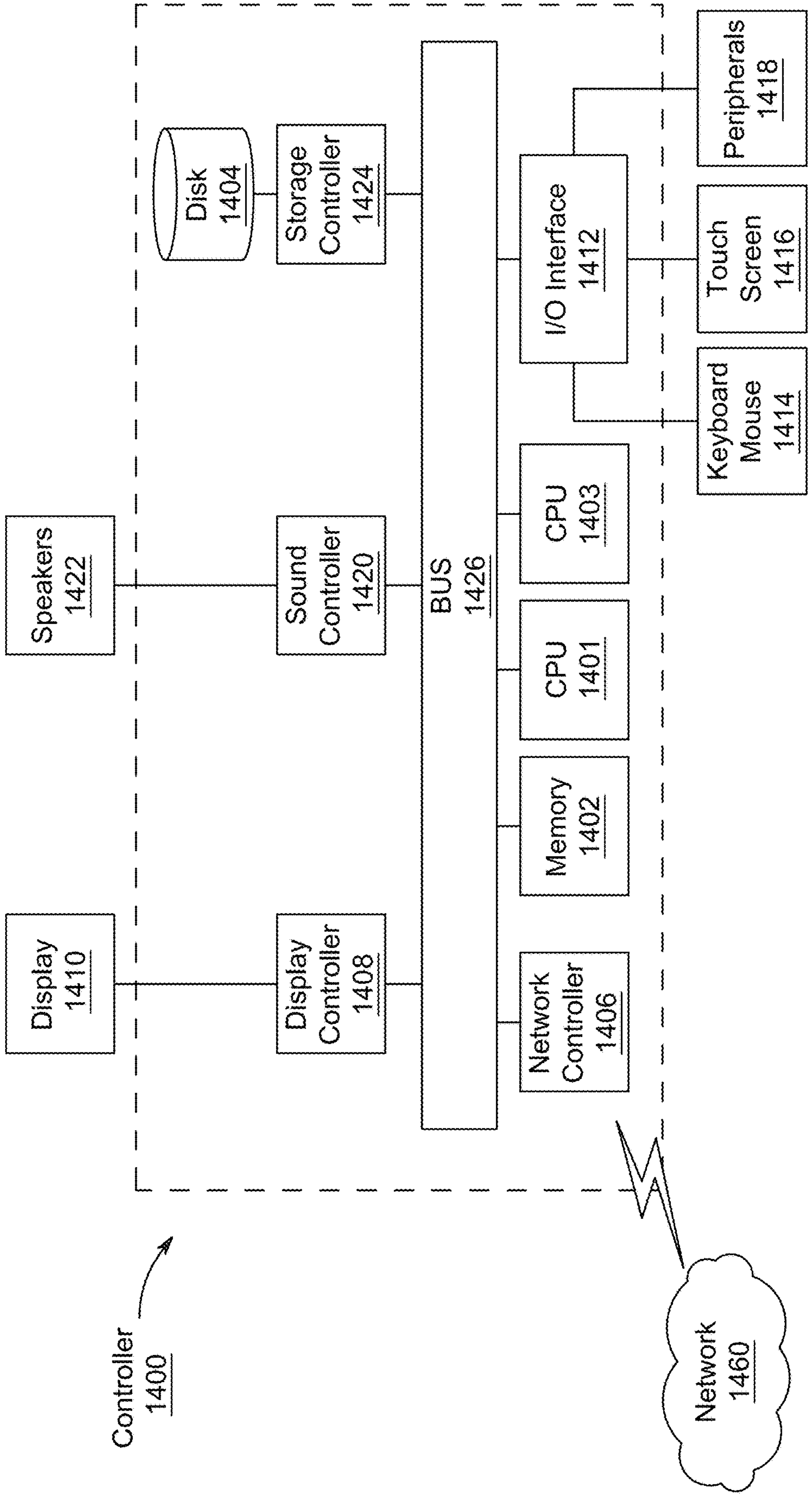
FIG. 14 is an illustration of a non-limiting example of details of computing hardware used in the computing system, according to aspects of the present disclosure.

Next, further details of the hardware description of the computing environment of FIG. 1 according to exemplary embodiments are described with reference to FIG. 14. In FIG. 14, a processing circuitry 1400 is described as representative of the antenna system 100 of FIG. 1 in which is a computing device which includes a CPU 1401 which performs the processes described above/below. The process data and instructions may be stored in memory 1402. These processes and instructions may also be stored on a storage medium disk 1404 such as a hard drive (HDD) or portable storage medium or may be stored remotely.

Further, the claims are not limited by the form of the computer-readable media on which the instructions of the inventive process are stored. For example, the instructions may be stored on CDs, DVDs, in FLASH memory, RAM, ROM, PROM, EPROM, EEPROM, hard disk or any other information processing device with which the computing device communicates, such as a server or computer.

Further, the claims may be provided as a utility application, background daemon, or component of an operating system, or combination thereof, executing in conjunction with CPU 1401 (and/or CPU 1403) and an operating system such as Microsoft Windows 7, Microsoft Windows 10, UNIX, Solaris, LINUX, Apple MAC-OS and other systems known to those skilled in the art.

The hardware elements in order to achieve the computing device may be realized by various circuitry elements, known to those skilled in the art. For example, the CPU 1401 and/or the CPU 1403 may be a Xenon or Core processor from Intel of America or an Opteron processor from AMD of America or may be other processor types that would be recognized by one of ordinary skill in the art. Alternatively, the CPU 1401 and/or the CPU 1403 may be implemented on an FPGA, ASIC, PLD or using discrete logic circuits, as one of ordinary skilled in the art would recognize. Further, the CPU 1401 and/or the CPU 1403 may be implemented as multiple processors cooperatively working in parallel to perform the instructions of the inventive processes described above.

The computing device in FIG. 14 also includes a network controller 1406, such as an Intel Ethernet PRO network interface card from Intel Corporation of America, for interfacing with network 1460. As can be appreciated, the network 1460 can be a public network, such as the Internet, or a private network such as an LAN or WAN network, or any combination thereof and can also include PSTN or ISDN sub-networks. The network 1460 can also be wired, such as an Ethernet network, or can be wireless such as a cellular network including EDGE, 3G and 4G wireless cellular systems. The wireless network can also be WiFi, Bluetooth, or any other wireless form of communication that is known.

The computing device further includes a display controller 1408, such as a NVIDIA GeForce GTX or Quadro graphics adaptor from NVIDIA Corporation of America for interfacing with display 1410, such as a Hewlett Packard HPL2445w LCD monitor. A general purpose I/O interface 1412 interfaces with a keyboard and/or mouse 1414 as well as a touch screen panel 1416 on or separate from display 1410. General purpose I/O interface also connects to a variety of peripherals 1418 including printers and scanners, such as an OfficeJet or DeskJet from Hewlett Packard.

A sound controller 1420 is also provided in the computing device such as Sound Blaster X-Fi Titanium from Creative, to interface with speakers/microphone 1422 thereby providing sounds and/or music.

The general purpose storage controller 1424 connects the storage medium disk 1404 with communication bus 1426, which may be an ISA, EISA, VESA, PCI, or similar, for interconnecting all of the components of the computing device. A description of the general features and functionality of the display 1410, keyboard and/or mouse 1414, as well as the display controller 1408, storage controller 1424, network controller 1406, sound controller 1420, and general purpose I/O interface 1412 is omitted herein for brevity as these features are known.

The exemplary circuit elements described in the context of the present disclosure may be replaced with other elements and structured differently than the examples provided herein. Moreover, circuitry configured to perform features described herein may be implemented in multiple circuit units (e.g., chips), or the features may be combined in circuitry on a single chipset, as shown on FIG. 15.

Figure 15:
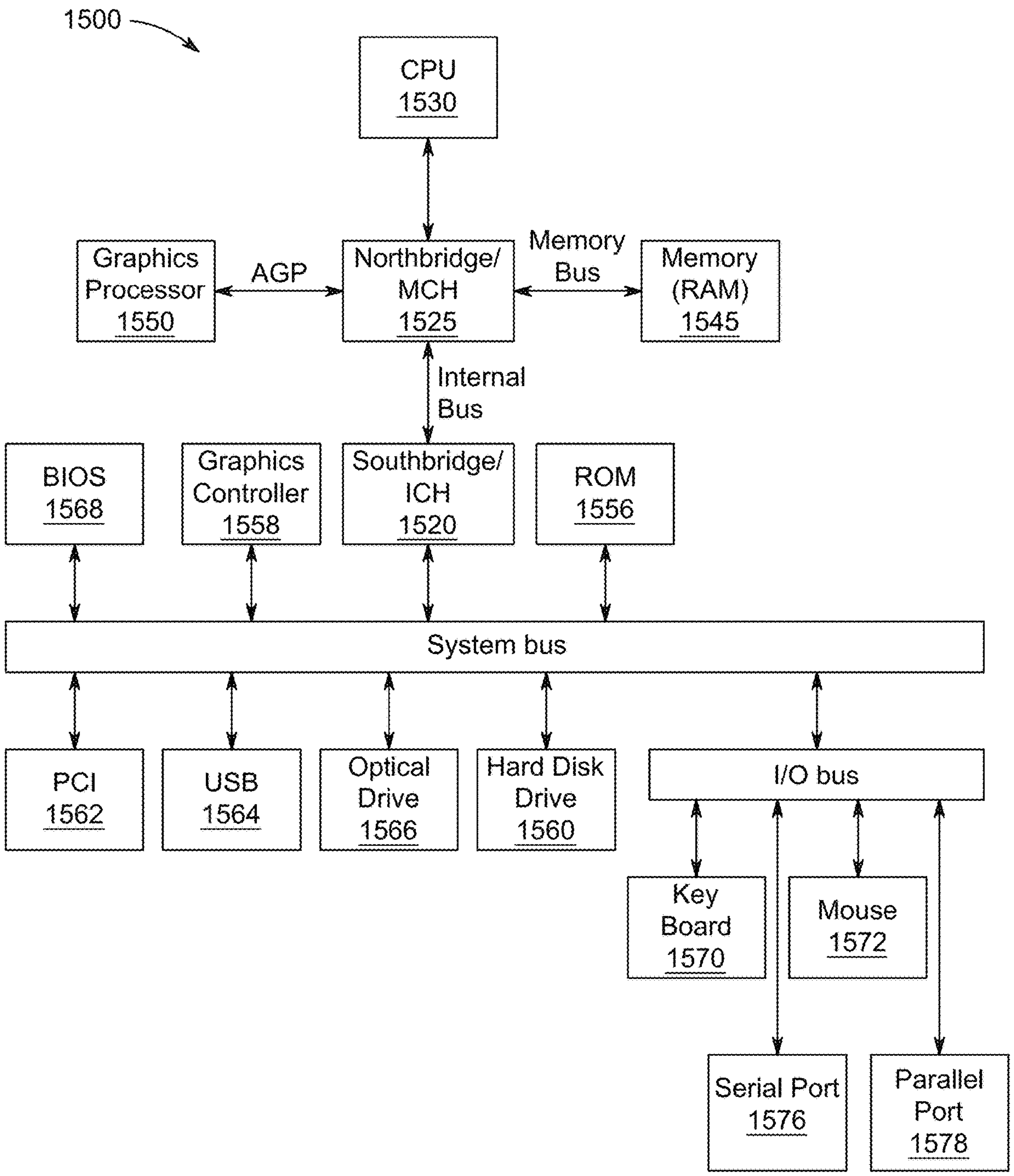
FIG. 15 is an exemplary schematic diagram of a data processing system used within the computing system, according to aspects of the present disclosure.

FIG. 15 shows a schematic diagram of a data processing system 1500, according to certain embodiments, for performing the functions of the exemplary embodiments. The data processing system is an example of a computer in which code or instructions implementing the processes of the illustrative embodiments may be located.

In FIG. 15, the data processing system 1500 employs a hub architecture including a north bridge and memory controller hub (NB/MCH) 1525 and a south bridge and input/output (I/O) controller hub (SB/ICH) 1520. The central processing unit (CPU) 1530 is connected to NB/MCH 1525. The NB/MCH 1525 also connects to the memory 1545 via a memory bus, and connects to the graphics processor 1550 via an accelerated graphics port (AGP). The NB/MCH 1525 also connects to the SB/ICH 1520 via an internal bus (e.g., a unified media interface or a direct media interface). The CPU Processing unit 1530 may contain one or more processors and even may be implemented using one or more heterogeneous processor systems.

Figure 16:
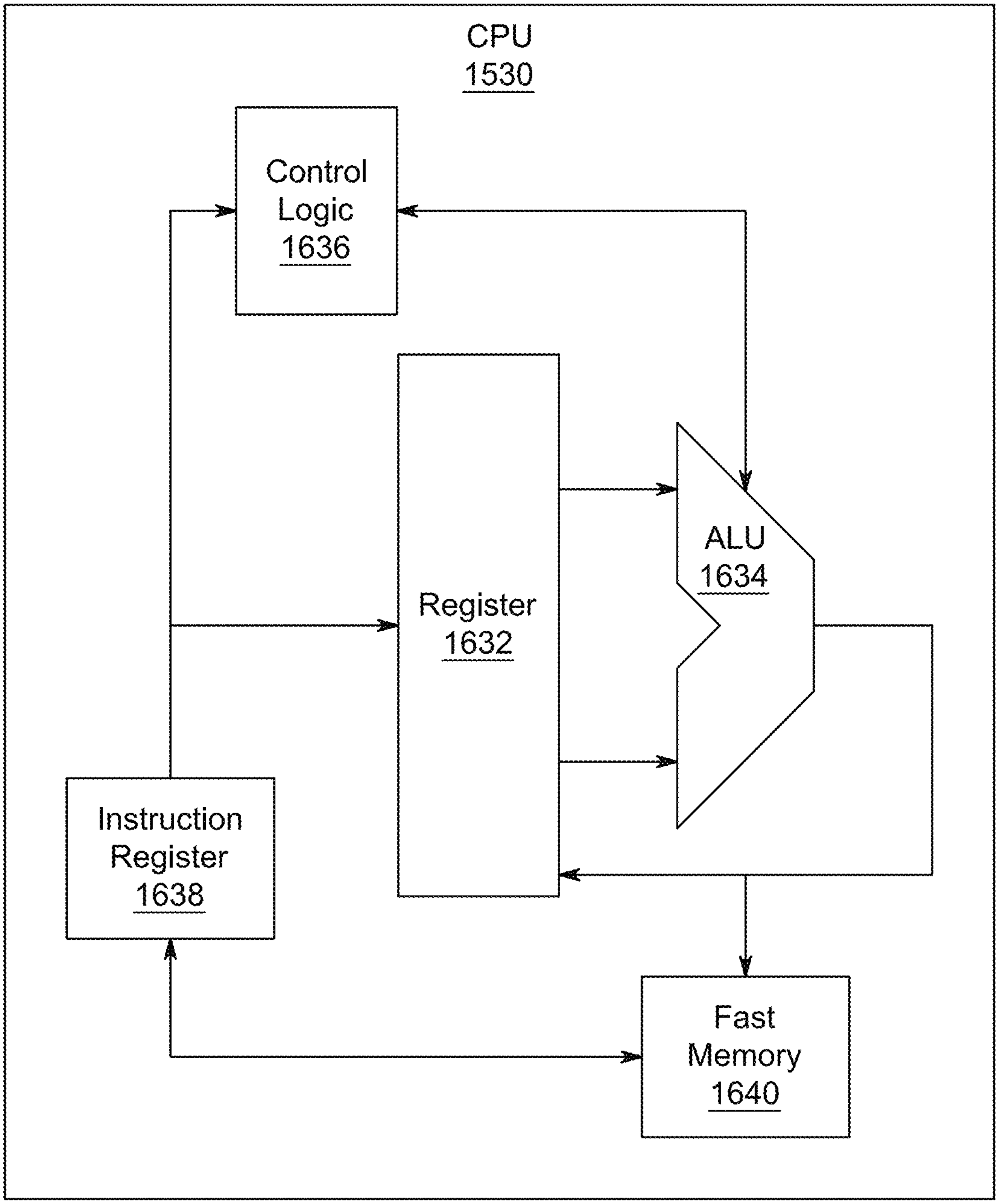
FIG. 16 is an exemplary schematic diagram of a processor used with the computing system, according to aspects of the present disclosure.

For example, FIG. 16 shows one implementation of the CPU 1530. In one implementation, the instruction register 1638 retrieves instructions from the fast memory 1640. At least part of these instructions is fetched from the instruction register 1638 by the control logic 1636 and interpreted according to the instruction set architecture of the CPU 1530. Part of the instructions can also be directed to the register 1632. In one implementation the instructions are decoded according to a hardwired method, and in another implementation the instructions are decoded according to a microprogram that translates instructions into sets of CPU configuration signals that are applied sequentially over multiple clock pulses. After fetching and decoding the instructions, the instructions are executed using the arithmetic logic unit (ALU) 1634 that loads values from the register 1632 and performs logical and mathematical operations on the loaded values according to the instructions. The results from these operations can be feedback into the register and/or stored in the fast memory 1640. According to certain implementations, the instruction set architecture of the CPU 1530 can use a reduced instruction set architecture, a complex instruction set architecture, a vector processor architecture, a very large instruction word architecture. Furthermore, the CPU 1530 can be based on the Von Neuman model or the Harvard model. The CPU 1530 can be a digital signal processor, an FPGA, an ASIC, a PLA, a PLD, or a CPLD. Further, the CPU 1530 can be an x56 processor by Intel or by AMD; an ARM processor, a Power architecture processor by, e.g., IBM; a SPARC architecture processor by Sun Microsystems or by Oracle; or other known CPU architecture.

Referring again to FIG. 15, the data processing system 1500 can include that the SB/ICH 1520 is coupled through a system bus to an I/O Bus, a read only memory (ROM) 1556, universal serial bus (USB) port 1564, a flash binary input/output system (BIOS) 1568, and a graphics controller 1558. PCI/PCIe devices can also be coupled to SB/ICH 1588 through a PCI bus 1562.

The PCI devices may include, for example, Ethernet adapters, add-in cards, and PC cards for notebook computers. The Hard disk drive 1560 and CD-ROM666 can use, for example, an integrated drive electronics (IDE) or serial advanced technology attachment (SATA) interface. In one implementation the I/O bus can include a super I/O (SIO) device.

Further, the hard disk drive (HDD) 1560 and optical drive 1566 can also be coupled to the SB/ICH 1520 through a system bus. In one implementation, a keyboard 1570, a mouse 1572, a parallel port 1578, and a serial port 1576 can be connected to the system bus through the I/O bus. Other peripherals and devices that can be connected to the SB/ICH 1520 using a mass storage controller such as SATA or PATA, an Ethernet port, an ISA bus, a LPC bridge, SMBus, a DMA controller, and an Audio Codec.

Moreover, the present disclosure is not limited to the specific circuit elements described herein, nor is the present disclosure limited to the specific sizing and classification of these elements. For example, the skilled artisan will appreciate that the circuitry described herein may be adapted based on changes on battery sizing and chemistry, or based on the requirements of the intended back-up load to be powered.

Figure 17:
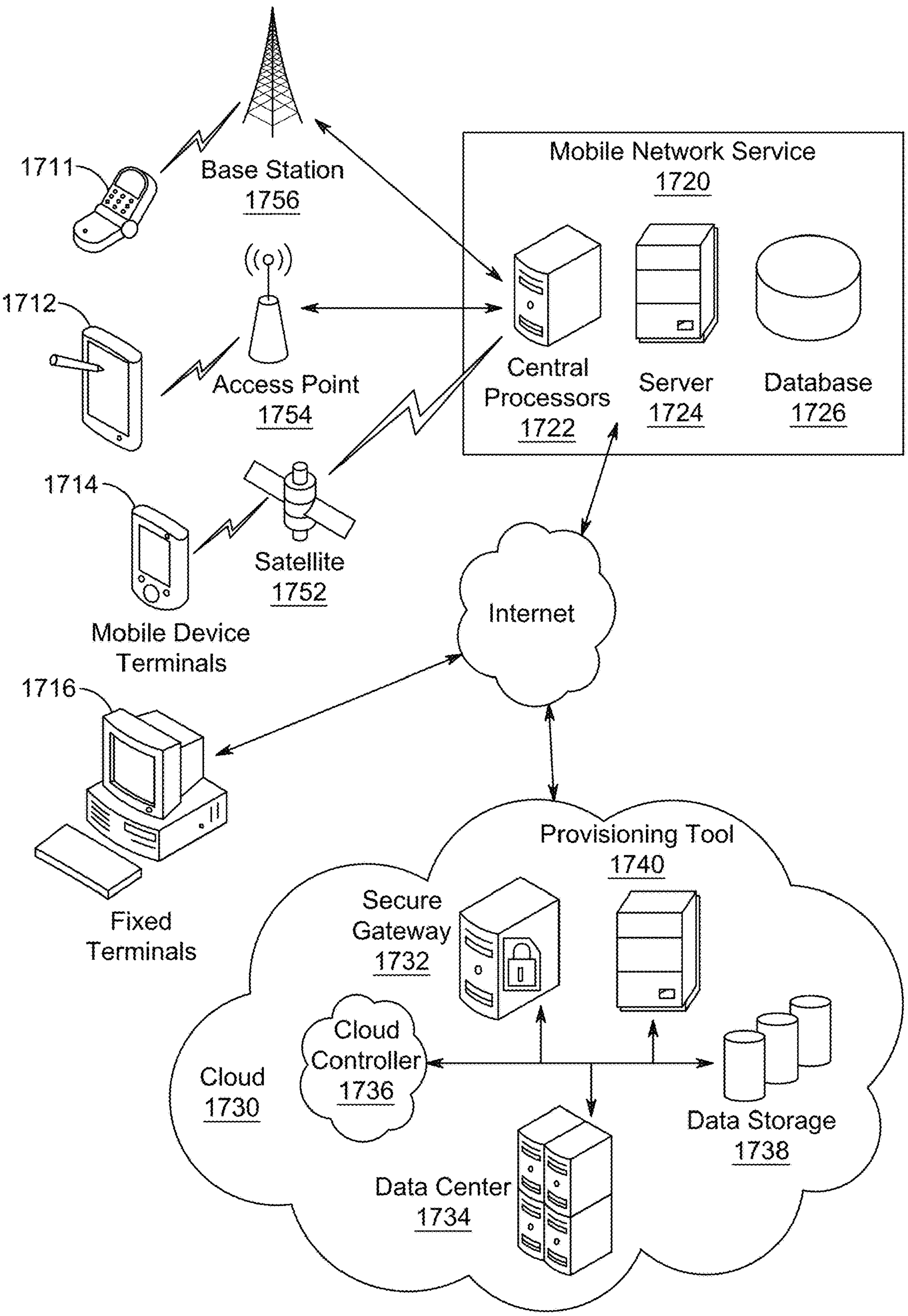
FIG. 17 is an illustration of a non-limiting example of distributed components that may share processing with the controller, according to aspects of the present disclosure.

The functions and features described herein may also be executed by various distributed components of a system. For example, one or more processors may execute these system functions, wherein the processors are distributed across multiple components communicating in a network. The distributed components may include one or more client and server machines, which may share processing, as shown by FIG. 17, in addition to various human interface and communication devices (e.g., display monitors, smart phones, tablets, personal digital assistants (PDAs)). The network may be a private network, such as a LAN or WAN, or may be a public network, such as the Internet. Input to the system may be received via direct user input and received remotely, either in real-time or as a batch process. Additionally, some aspects of the present disclosures may be performed on modules or hardware not identical to those described. Accordingly, other aspects of the present disclosures are within the scope that may be claimed. More specifically, FIG. 17 illustrates client devices including smart phone 1711, tablet 1712, mobile device terminal 1714 and fixed terminals 1716. These client devices may be commutatively coupled with a mobile network service 1720 via base station 1756, access point 1754, satellite 1752 or via an internet connection. Mobile network service 1720 may comprise central processors 1722, server 1724 and database 1726. Fixed terminals 1716 and mobile network service 1720 may be commutatively coupled via an internet connection to functions in cloud 1730 that may comprise security gateway 1732, data center 1734, cloud controller 1736, data storage 1738 and provisioning tool 1740.

The above-described hardware description is a non-limiting example of corresponding structure for performing the functionality described herein.

Obviously, numerous modifications and variations of the present disclosure are possible in light of the above teachings. It is therefore to be understood that within the scope of the appended claims, the invention may be practiced otherwise than as specifically described herein.

The invention claimed is:

1. An antenna system, comprising:

a substrate having a top side and a bottom side;

a single straight microstrip line on the top side of the substrate, an input end of the single straight microstrip line being adjacent and vertical to a first edge of the substrate, and an output end of the single straight microstrip line being open;

a microstrip power divider (PD) on the top side of the substrate, an input end of the microstrip PD being adjacent and vertical to a second edge of the substrate, eight output ends of the microstrip PD being open, and the first edge being parallel to the second edge; and a ground plane on the bottom side, three concentric square slots being etched on the ground plane.

2. The antenna system of claim 1, wherein a dielectric constant of the substrate is about 3.48, a loss tangent of the substrate is about 0.0036, and a thickness of the substrate is about 0.508 mm.

3. The antenna system of claim 1, wherein the microstrip PD is a cascaded 8-way power divider.

4. The antenna system of claim 1, wherein a size of the substrate is about 50 $mm^2$×about 50 $mm^2$.

5. The antenna system of claim 1, wherein a size of the single straight microstrip line is about 15.3 $mm^2$×about 1.4 $mm^2$.

6. The antenna system of claim 1, wherein lengths of the three concentric square slots are about 33.33 mm, about 28.93 mm, and about 23.43 mm, respectively, widths of the three concentric square slots are all about 0.5 mm, and spaces between every two adjacent concentric square slots are about 2 mm and about 2.5 mm, respectively.

7. The antenna system of claim 1, wherein the input end of the single straight microstrip line is excited with a sub-6 GHz frequency, and the input end of the microstrip PD is excited with a millimeter-wave frequency.

8. A method of fabricating an antenna system, the method comprising:

generating a single straight microstrip line on a top side of a substrate of the antenna system, an input end of the single straight microstrip line being adjacent and vertical to a first edge of the substrate, and an output end of the single straight microstrip line being open;

generating a microstrip power divider (PD) on the top side of the substrate, an input end of the microstrip PD being adjacent and vertical to a second edge of the substrate, eight output ends of the microstrip PD being open, and the first edge being parallel to the second edge; and generating a ground plane on a bottom side of the substrate, three concentric square slots being etched on the ground plane.

9. The method of claim 8, wherein a dielectric constant of the substrate is about 3.48, a loss tangent of the substrate is about 0.0036, and a thickness of the substrate is about 0.508 mm.

10. The method of claim 8, wherein the microstrip PD is a cascaded 8-way power divider.

11. The method of claim 8, wherein a size of the substrate is about 50 $mm^2$×about 50 $mm^2$.

12. The method of claim 8, wherein a size of the single straight microstrip line is about 15.3 $mm^2$×about 1.4 $mm^2$.

13. The method of claim 8, wherein lengths of the three concentric square slots are about 33.33 mm, about 28.93 mm, and about 23.43 mm, respectively, widths of the three concentric square slots are all about 0.5 mm, and spaces between every two adjacent concentric square slots are about 2 mm and about 2.5 mm, respectively.

14. The method of claim 8, wherein the input end of the single straight microstrip line is excited with a sub-6 GHz frequency, and the input end of the microstrip PD is excited with a millimeter-wave frequency.

15. A non-transitory computer-readable storage medium storing a program executable by at least one processor to perform:

generating a single straight microstrip line on a top side of a substrate of the antenna system, an input end of the single straight microstrip line being adjacent and vertical to a first edge of the substrate, and an output end of the single straight microstrip line being open;

generating a microstrip power divider (PD) on the top side of the substrate, an input end of the microstrip PD being adjacent and vertical to a second edge of the substrate, eight output ends of the microstrip PD being open, and the first edge being parallel to the second edge; and generating a ground plane on a bottom side of the substrate, three concentric square slots being etched on the ground plane.

16. The non-transitory computer-readable storage medium of claim 15, wherein a dielectric constant of the substrate is set as about 3.48, a loss tangent of the substrate is set as about 0.0036, and a thickness of the substrate is set as about 0.508 mm.

17. The non-transitory computer-readable storage medium of claim 15, wherein the microstrip PD is generated as a cascaded 8-way power divider.

18. The non-transitory computer-readable storage medium of claim 15, wherein a size of the substrate is set as about 50 $mm^2$×about 50 $mm^2$.

19. The non-transitory computer-readable storage medium of claim 15, wherein a size of the single straight microstrip line is set as about 15.3 $mm^2$×about 1.4 $mm^2$.

20. The non-transitory computer-readable storage medium of claim 15, wherein lengths of the three concentric square slots are set as about 33.33 mm, about 28.93 mm, and about 23.43 mm, respectively, widths of the three concentric square slots are all set as about 0.5 mm, and spaces between every two adjacent concentric square slots are set as about 2 mm and about 2.5 mm, respectively.

* * * * *